(12) United States Patent
Hayes

(10) Patent No.: US 12,515,018 B2
(45) Date of Patent: Jan. 6, 2026

(54) CATHETER WITH EMBEDDED CORE WIRES AND SHAPING RIBBONS

(71) Applicant: Lake Region Manufacturing, Inc., Chaska, MN (US)

(72) Inventor: John Michael Hayes, Cork (IE)

(73) Assignee: Greatbatch Ltd., Clarence, NY (US)

( * ) Notice: Subject to any disclaimer, the term of this patent is extended or adjusted under 35 U.S.C. 154(b) by 1010 days.

(21) Appl. No.: 17/491,811

(22) Filed: Oct. 1, 2021

(65) Prior Publication Data

US 2022/0016396 A1 Jan. 20, 2022

Related U.S. Application Data

(62) Division of application No. 16/938,935, filed on Jul. 25, 2020, now abandoned.
(Continued)

(51) Int. Cl.
*A61M 25/01* (2006.01)
*A61M 25/00* (2006.01)
*A61M 25/09* (2006.01)

(52) U.S. Cl.
CPC .... *A61M 25/0147* (2013.01); *A61M 25/0054* (2013.01); *A61M 25/0068* (2013.01);
(Continued)

(58) Field of Classification Search
CPC .......... A61M 25/0054; A61M 25/0068; A61M 25/0053; A61M 25/005; A61M 2025/0059; A61B 1/00078
See application file for complete search history.

(56) References Cited

U.S. PATENT DOCUMENTS 3,470,876 A 10/1969 Barchilon
3,906,938 A * 9/1975 Fleischhacker ...........................
A61M 25/09033
604/170.01
(Continued)

FOREIGN PATENT DOCUMENTS

CA 2215399 3/1996
DE 102006007974 A1 8/2007
(Continued)

OTHER PUBLICATIONS

"Extended European Search Report Dated Sep. 13, 2022, Application No. 20187972.3".
(Continued)

*Primary Examiner* — Bhisma Mehta
*Assistant Examiner* — Adam J. Cermak
(74) *Attorney, Agent, or Firm* — Michael F. Scalise

(57) ABSTRACT

A kink-resistance catheter has a first pair of core wires residing in the catheter body on opposed side of a catheter lumen. The core wires have relatively stiff proximal ends but taper toward their distal ends. The tapered construction provides the core wires with a degree of distal flexibility that helps the catheter advance along a vasculature to a site of interest without kinking and with improved torsional rigidity. If desired, shaping ribbons are provided in the catheter body adjacent to the distal ends of the core wires. The shaping ribbons can be pre-bent before a surgical procedure to help the physician advance the catheter along the vasculature. Finally, the core wires provide the ability to push the catheter through the vasculature with out the need for the catheter to go over a guidewire already in-situ in the vasculature.

29 Claims, 11 Drawing Sheets

Related U.S. Application Data

(60) Provisional application No. 62/878,939, filed on Jul. 26, 2019.

(52) U.S. Cl.
CPC ..... *A61M 25/09* (2013.01); *A61M 2025/0059* (2013.01); *A61M 2025/09083* (2013.01); *A61M 2025/09133* (2013.01); *A61M 2205/02* (2013.01)

(56) References Cited

U.S. PATENT DOCUMENTS

| | | | | |
|---|---|---|---|---|
| 4,639,252 | A * | 1/1987 | Kelly | A61M 25/007 604/6.16 |
| 4,686,963 | A * | 8/1987 | Cohen | A61B 1/0055 138/120 |
| 4,934,340 | A * | 6/1990 | Ebling | A61B 1/0058 600/117 |
| 5,176,660 | A | 1/1993 | Truckai | |
| 5,372,587 | A * | 12/1994 | Hammerslag | A61M 25/0144 604/95.04 |
| 5,374,245 | A * | 12/1994 | Mahurkar | A61M 25/005 604/43 |
| 5,658,251 | A | 8/1997 | Ressemann et al. | |
| 5,704,926 | A * | 1/1998 | Sutton | A61M 25/005 604/526 |
| 5,827,242 | A | 10/1998 | Follmer et al. | |
| 5,911,715 | A | 6/1999 | Berg et al. | |
| 6,210,395 | B1 | 4/2001 | Fleischhacker et al. | |
| 6,217,565 | B1 | 4/2001 | Cohen et al. | |
| 6,290,692 | B1 | 9/2001 | Klima et al. | |
| 6,450,948 | B1 * | 9/2002 | Matsuura | A61B 1/0055 606/1 |
| 6,464,684 | B1 | 10/2002 | Galdonik et al. | |
| 6,579,221 | B1 * | 6/2003 | Peterson | A61N 5/1002 600/3 |
| 6,709,429 | B1 | 3/2004 | Schaefer et al. | |
| 6,939,327 | B2 | 9/2005 | Hall et al. | |
| 7,351,238 | B2 | 4/2008 | Lee et al. | |
| 7,722,551 | B2 | 5/2010 | Murayama et al. | |
| 7,972,323 | B1 * | 7/2011 | Bencini | A61M 25/0136 604/524 |
| 8,133,267 | B2 * | 3/2012 | Leonhardt | A61B 17/12172 623/1.13 |
| 8,206,372 | B2 | 6/2012 | Larson et al. | |
| 8,348,924 | B2 | 1/2013 | Christian et al. | |
| 8,551,020 | B2 | 10/2013 | Chen et al. | |
| 9,174,022 | B2 * | 11/2015 | Uihlein | G02B 23/2476 |
| 9,526,887 | B2 * | 12/2016 | Finley | A61N 1/3605 |
| 9,622,892 | B2 | 4/2017 | Baker et al. | |
| 9,717,559 | B2 | 8/2017 | Ditter et al. | |
| 10,668,258 | B1 | 6/2020 | Calhoun et al. | |
| 11,090,465 | B2 * | 8/2021 | Weber | A61M 25/005 |
| 2003/0004493 | A1 * | 1/2003 | Casey | A61M 25/005 604/525 |
| 2005/0027338 | A1 * | 2/2005 | Hill | A61N 1/05 607/116 |
| 2005/0209582 | A1 * | 9/2005 | Quinn | A61M 25/0053 604/161 |
| 2006/0074308 | A1 * | 4/2006 | Rafiee | A61M 25/0054 604/529 |
| 2006/0111649 | A1 | 5/2006 | Zhou | |
| 2006/0270977 | A1 | 11/2006 | Fisher et al. | |
| 2007/0016133 | A1 * | 1/2007 | Pepper | A61M 25/0052 604/103.04 |
| 2007/0016165 | A1 | 1/2007 | Von et al. | |
| 2007/0100285 | A1 | 5/2007 | Griffin et al. | |
| 2008/0125674 | A1 | 5/2008 | Bilecen et al. | |
| 2008/0139999 | A1 * | 6/2008 | Gibson | A61M 25/0147 604/95.04 |
| 2008/0188832 | A1 | 8/2008 | Tanioka et al. | |
| 2009/0163891 | A1 | 6/2009 | Ewing et al. | |
| 2009/0163946 | A1 * | 6/2009 | Casey | A61B 17/22031 604/524 |
| 2011/0218603 | A1 * | 9/2011 | Victorine | H01R 43/048 29/874 |
| 2013/0289697 | A1 * | 10/2013 | Baker | A61M 25/0053 156/244.11 |
| 2014/0207115 | A1 | 7/2014 | Brustad et al. | |
| 2014/0214006 | A1 * | 7/2014 | Hiroshige | A61M 25/0012 604/527 |
| 2014/0330355 | A1 * | 11/2014 | Stevenson | A61N 1/05 607/116 |
| 2015/0202430 | A1 * | 7/2015 | Finley | A61N 1/0558 29/854 |
| 2016/0051798 | A1 | 2/2016 | Weber et al. | |
| 2016/0158490 | A1 * | 6/2016 | Leeflang | A61M 25/005 29/882 |
| 2016/0296332 | A1 * | 10/2016 | Zhou | A61M 25/0662 |
| 2018/0311477 | A1 | 11/2018 | Telang | |
| 2019/0030280 | A1 * | 1/2019 | Yokoyama | A61M 25/0054 |
| 2019/0183517 | A1 * | 6/2019 | Ogle | A61M 1/84 |
| 2019/0224456 | A1 | 7/2019 | Kon et al. | |
| 2020/0054861 | A1 | 2/2020 | Korkuch et al. | |
| 2020/0061340 | A1 | 2/2020 | Mixter et al. | |
| 2020/0305733 | A1 | 10/2020 | Caron et al. | |
| 2021/0299402 | A1 * | 9/2021 | Sakamoto | A61M 25/0052 |
| 2021/0353906 | A1 * | 11/2021 | Hoshino | A61M 25/005 |
| 2022/0016396 | A1 * | 1/2022 | Hayes | A61M 25/0054 |
| 2023/0218858 | A1 * | 7/2023 | Kugler | A61M 25/005 604/164.01 |

FOREIGN PATENT DOCUMENTS

| | | |
|---|---|---|
| EP | 0410557 A2 | 1/1991 |
| EP | 0790066 A2 | 8/1997 |
| EP | 2030557 A1 | 3/2009 |
| EP | 3395393 | 10/2018 |
| EP | 3398625 A1 | 11/2018 |
| EP | 2635339 B1 | 1/2019 |
| JP | 4796534 B2 | 8/2011 |
| WO | 9117782 A1 | 11/1991 |
| WO | 9207594 A1 | 5/1992 |
| WO | 9320877 A1 | 10/1993 |
| WO | 02083223 A1 | 10/2002 |
| WO | 2006127929 A2 | 11/2006 |
| WO | 2010060889 A1 | 6/2010 |
| WO | 2016049149 A2 | 3/2016 |
| WO | 2017044131 | 3/2017 |

OTHER PUBLICATIONS

"Extended European Search Report Dated Dec. 11, 2020, Application No. 20187972.3".

Communication pursuant to Article 94(3) EPC, EP 20187972.3 filed Jun. 10, 2021.

* cited by examiner

CATHETER WITH EMBEDDED CORE WIRES AND SHAPING RIBBONS

CROSS-REFERENCE TO RELATED APPLICATIONS

This application is a divisional of U.S. patent application Ser. No. 16/938,935, filed on Jul. 25, 2020, now abandoned, which claims priority to U.S. provisional application Ser. No. 62/878,939, filed on Jul. 26, 2019.

BACKGROUND OF THE INVENTION

1. Field of the Invention

The present invention relates to the art of delivering medical therapy to a remote site in a body. Catheters are typically used for that purpose. More particularly, the present catheters are provided with at least one core wire and, more particularly, a first pair of core wires disposed on opposite sides of a primary lumen. In alternate embodiments, the catheter has a second pair of core wires on opposite sides of the primary lumen, the second pair being spaced 90° from the first pair of core wires.

2. Prior Art

Catheters are often used to deliver medical therapy to a remote site in a body, be it in a vasculature system or otherwise. For example, catheters are often used to deliver a medical therapy to a coronary artery in the cardiovascular system of a human or animal body, the renal vessels, the neuro-vasculature system, the fallopian tubes, and other such vessels and sites. These types of procedures often require that the catheter bend in many abrupt directions as it travels through the vasculature to the site of interest. Because of their cylindrical structure, however, should a bend radius in the vasculature be severe enough, forming a kink in the catheter is a realistic concern. Should a catheter kink inside the vasculature of a human or animal body, it can be rendered inoperative for use in the intended medical procedure and removing the kinked catheter could cause damage to the vasculature. Not only is that unacceptable, but a new catheter must be inserted into the vasculature to complete the medical procedure. This increases the time that the patient is under sedation without certainty that the second catheter will perform any better than the first.

SUMMARY OF THE INVENTION

Accordingly, there is a needed for an improved catheter that is suitable for delivering a medical therapy to a remote site in a human or animal body. Even if the catheter is required to bend in many abrupt directions as it travels through the vasculature to the site of interest, the catheter needs to be less prone to kinking than conventional catheters.

Kink-resistance is provided by incorporating at least one core wire, and more particularly, a first pair of core wires into the catheter body on opposed sides of the catheter lumen. The core wires, which taper from their proximal end to their distal end, extend from adjacent to a proximal end of the catheter to adjacent to the distal end thereof. That way, the tapered core wires provide a desired degree of rigidity to the proximal end of the catheter while the distal end is relatively flexible but less likely to kink or deform, even when travelling through a vasculature with a relatively tortuous path.

Further, having the core wires end proximal the distal end of the catheter means that the catheter is less likely to puncture or rupture the vessel. Additionally, the core wires greatly improve the torsional rigidity of the catheter so that rotation of the catheter's proximal end about its longitudinal axis translates into a substantially equivalent rotation at the distal end of the catheter. Ideally, the catheter maintains a 1:1 rotational integrity about its longitudinal axis from the catheter proximal end to the distal end thereof. Finally, incorporating at least one core wire into the catheter body provides the ability to push the catheter through the vasculature without the need for the catheter to go over a guidewire already in-situ in the vasculature.

These and other objects of the present invention will become increasingly more apparent to those skilled in the art by reference to the following detailed description and to the appended drawings.

DETAILED DESCRIPTION OF THE PREFERRED EMBODIMENTS

Figure 1:
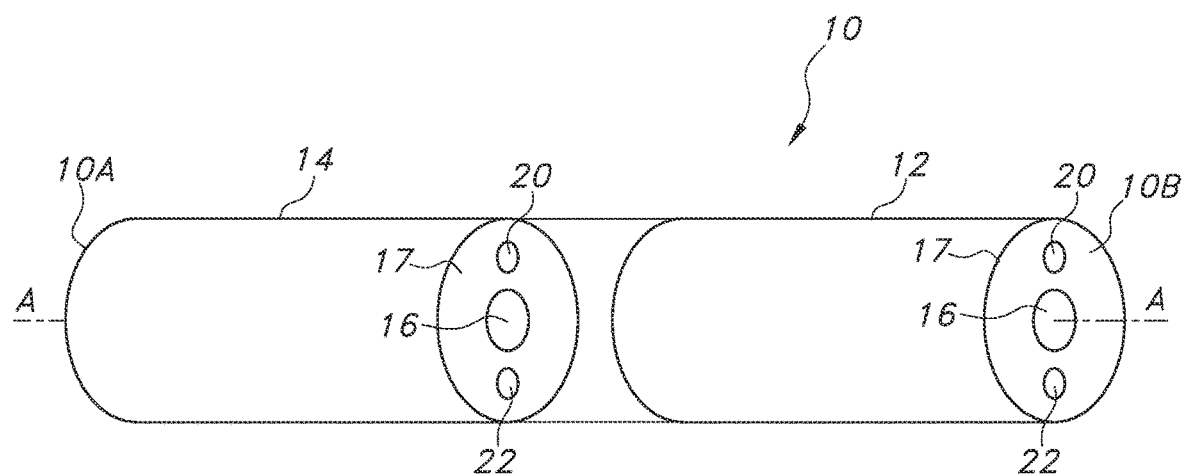
FIG. 1 is a broken, perspective view of a catheter 10 according to the present invention comprising spaced apart core wires 20 and 22 on opposite sides of a primary lumen 16.
Figure 2:
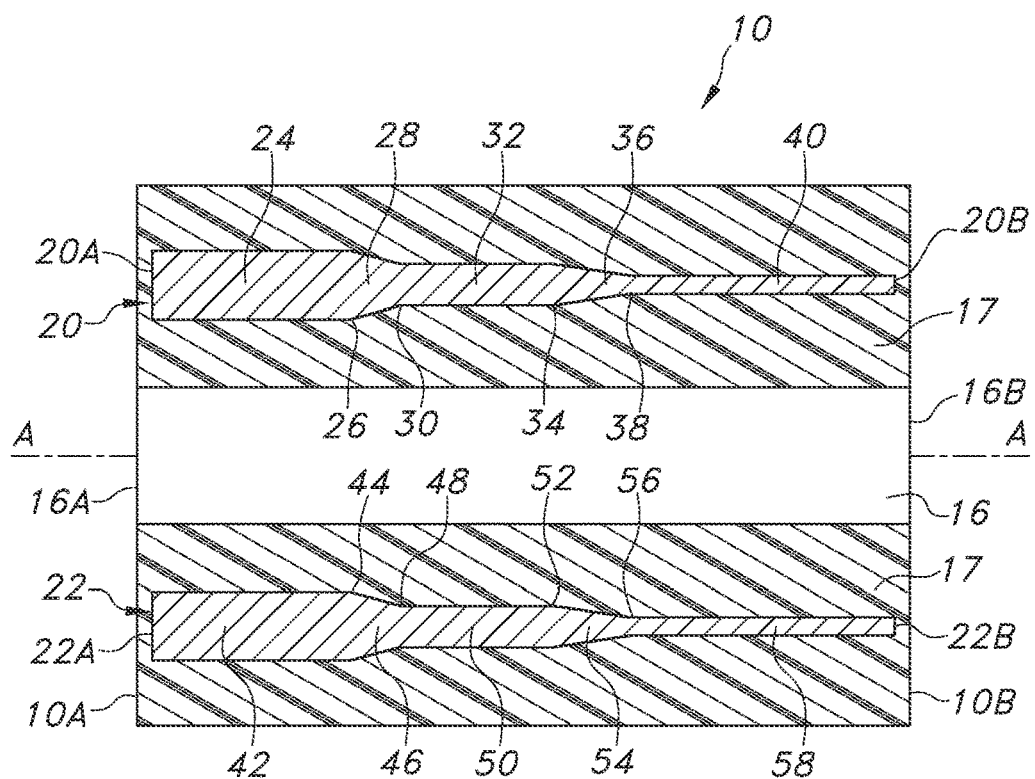
FIG. 2 is a cross-sectional view of the catheter 10 shown in FIG. 1.

Turning now to the drawings, an exemplary catheter 10 according to the present invention is illustrated in FIGS. 1 and 2. The catheter 10 has a cylindrically-shaped catheter body 12 having an outer wall 14 extending along a longitudinal axis A-A from a catheter proximal end 10A to a catheter distal end 10B. The catheter 10 has a primary lumen 16 that is in open communication with a proximal opening 16A at the catheter proximal end 10A and a distal opening 16B at the catheter distal end 10B. Preferably the catheter lumen 16 has a cylindrical shape throughout its length extending to the proximal and distal openings 16A, 16B, but that is not required.

In an alternate embodiment, the catheter lumen has an oval shape extending to the proximal and distal openings 16A, 16B, or the lumen 16 can have a cylindrically-shaped proximal lumen portion extending distally from the proximal opening 16A in open communication with an oval-shaped distal lumen portion extending the remainder of the lumen length to the distal opening 16B.

The catheter body 12 is formed of a biocompatible and biostable primary polymeric material 17 that has a cross-sectional thickness extending outwardly from the lumen 16 to the outer wall 14. Suitable biocompatible and biostable primary polymeric materials include thermoplastics such as Nylon, PEBAX® (a block copolymer obtained by polycondensation of a carboxylic acid polyamide with an alcohol termination polyether), PET, thermosets such as silicone, polytetrafluoroethylene (PTFE), polyimide and composites such as liquid crystal polymers. If desired, these materials can be glass-filled or filled with a radiopaque material. Examples of radiopaque fillers are barium sulphate, bismuth subcarbonate, and tungsten.

As shown in FIGS. 1 and 2, in an exemplary embodiment of the present invention, a first core wire 20 and a second core wire 22 are encased or otherwise embedded in the primary polymeric material 17. The first core wire 20 is, for example, of stainless steel or nitinol (an extremely flexible nickel-titanium alloy) and extends longitudinally along an axis that is parallel to the axis A-A of the catheter 10. The first core wire 20 has a first core wire proximal end 20A extending to a first core wire distal end 20B. Similarly, the second core wire 22 is, for example, of stainless steel or nitinol and extends along a longitudinal axis that is parallel to the axis A-A of the catheter 10 and the longitudinal axis of the first core wire 20. The second core wire 22 has a second core wire proximal end 22A extending to a second core wire distal end 22B.

While two core wires 20 and 22 are shown extending through the catheter body 12, it is within the scope of the present invention that only one of the core wires, either 20 or 22, is sufficient to provide the catheter 10 with the desired distal flexibility and torsional rigidity.

As shown in the cross-sectional view of FIG. 2, the first core wire 20 has a first cylindrically-shaped portion 24 of a first circular transverses cross-section of a first constant diameter that ranges from about 1 mm to about 0.3 mm. At cross-sectional location 26, the first cylindrical portion 24 meets a first tapered portion 28 that tapers downwardly and distally along the longitudinal axis of the core wire 20 towards cross-sectional location 30 where a second cylindrically-shaped portion 32 begins. The second cylindrically-shaped portion 32 is of a second circular transverse cross-section of a second constant diameter that is less than the first constant diameter and ranges from about 0.8 mm to about 0.2 mm. At cross-sectional location 34, the second cylindrical portion 32 meets a second tapered portion 36 that tapers downwardly and distally along the longitudinal axis towards cross-sectional location 38 where a third cylindrically-shaped portion 40 begins. The third cylindrically-shaped portion 40 is of a third circular transverse cross-section of a third constant diameter that is less than the second constant diameter and ranges from about 0.6 mm to about 0.03 mm.

The cross-section of FIG. 2 further shows that the second core wire 22 has a fourth cylindrically-shaped portion 42 of a fourth circular transverse cross-section of a fourth constant diameter that ranges from about 1 mm to about 0.3 mm. At cross-sectional location 44, the fourth cylindrical portion 42 meets a third tapered portion 46 that tapers downwardly and distally along the longitudinal axis of the core wire 22 towards cross-sectional location 48 where a fifth cylindrically-shaped portion 50 begins. The fifth cylindrically-shaped portion 50 is of a fifth circular transverse cross-section of a fifth constant diameter that is less than the fourth constant diameter and ranges from about 0.8 mm to about 0.2 mm. At cross-sectional location 52, the fifth cylindrical portion 50 meets a fourth tapered portion 54 that tapers downwardly and distally along the longitudinal axis towards cross-sectional location 56 where a sixth cylindrically-shaped portion 58 begins. The sixth cylindrically-shaped portion 58 is of a sixth circular transverse cross-section of a sixth constant diameter that is less than the fifth constant diameter and ranges from about 0.6 mm to about 0.03 mm.

Preferably the proximal end 20A of the first cylindrical portion 24, which is the proximal end of the first core wire 20, is distal the catheter proximal end 10A while the distal end 20B of the third cylindrical portion 40, which is the distal end of the first core wire 20, is proximal the catheter distal end 10B. In a similar manner, it is preferred that the proximal end 22A of the fourth cylindrical portion 42, which is the proximal end of the second core wire 22, is distal the catheter proximal end 10A while the distal end 22B of the sixth cylindrical portion 58, which is the distal end of the second core wire 22, is proximal the catheter distal end 10B.

Thus, the distance from the catheter proximal end 10A to the proximal ends of the first and second core wires 20, 22 ranges from about 2 mm to about 5 mm. Similarly, the distance from the catheter distal end 10B to the distal ends of the first and second core wires 20, 22 ranges from about 2 mm to about 5 mm. That way, the proximal end 20A of the first cylindrical portion 24 and the distal end 20B of the third cylindrical portion 40 of the first core wire 20, and the proximal end 22A of the fourth cylindrical portion 42 and the distal end 22B of the sixth cylindrical portion 58 of the second core wire 22 are encased or embedded in the primary polymeric material 17 of the catheter 10. This helps prevent the first and second core wires 20, 22 from puncturing through the primary polymeric material 17 and becoming exposed, which is undesirable.

Figure 1A:
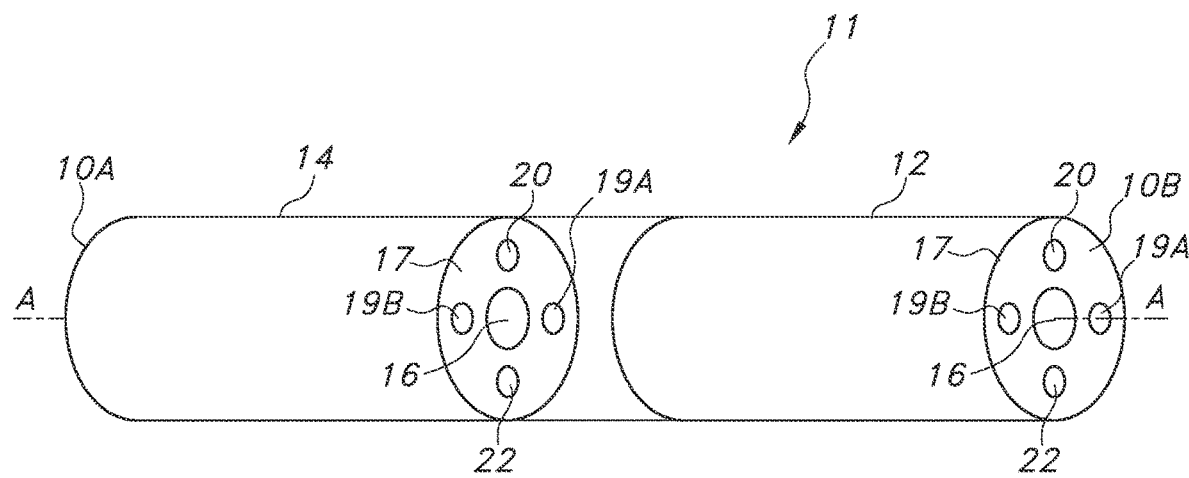
FIG. 1A is a broken, perspective view of a catheter 11 that is similar to catheter 10 shown in FIG. 1, but with multiple lumens 16, 19A and 19B.

FIG. 1A illustrates a catheter 11 that is similar to catheter 10 shown in FIG. 1, but with multiple lumens 16, 19A and 19B. The lumens 16, 19A and 19B can have the same or different diameters. For example, lumens 19A and 19B can have diameters that are smaller than that of lumen 16. Core wires 20 and 22 are shown extending along the length of the catheter 10A.

Figure 3:
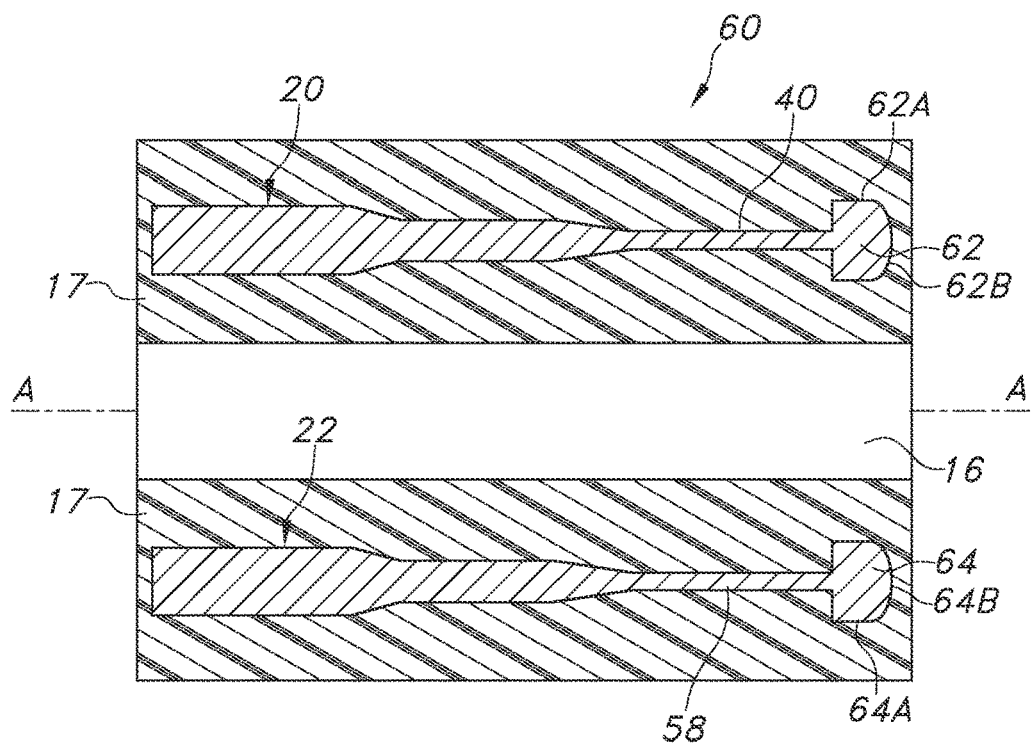
FIG. 3 is a cross-sectional view of another embodiment of a catheter 60 according to the present invention where the core wires 20 and 22 have respective atraumatic tips 62 and 64.

FIG. 3 shows another embodiment of a catheter 60 according to the present invention. Catheter 60 is similar to the catheter 10 shown in FIGS. 1 and 2 except that to help prevent the first and second core wires 20 and 22 from puncturing through the distal end 10B of the primary polymeric material 17, the respective third and sixth cylindrically-shaped portions 40 and 58 are provided with a respective atraumatic tip 62 and 64. The first atraumatic tip 62 has an enlarged cylindrical portion 62A connected to the third cylindrically-shaped portion 40 of the first core wire 20 and extending to a curved distal surface 62B. Similarly, the second atraumatic tip 64 has an enlarged cylindrical portion 64A connected to the sixth cylindrically-shaped portion 50 of the second core wire 22 and extending to a curved distal surface 64B. While both of the first and second core wires 20 and 22 are shown with respective atraumatic tips 62 and 64 in this embodiment, that is not necessary. Either one of the core wires 20 or 22 can have an atraumatic tip while the other does not. Moreover, the distance from the curved distal surfaces 62B, 64B of the respective atraumatic tips 62, 64 to the catheter distal end 10B ranges from about 1 mm to about 0.2 mm.

FIGS. 4 to 7 illustrate another embodiment of a catheter 100 according to the present invention. Catheter 100 is similar to the catheter 10 shown in FIGS. 1 and 2 in that it comprises a cylindrically-shaped catheter body 102 having an outer wall 104 extending along a longitudinal axis B-B from a catheter proximal end 100A to a catheter distal end 100B. The catheter 100 has a primary lumen 106 that is in open communication with a proximal opening 106A at the catheter proximal end 100A and a distal opening 106B at the catheter distal end 100B. Preferably, the catheter lumen 106 has a cylindrical shape throughout its length extending to the proximal and distal openings 106A, 106B, but, as described above with respect to the catheter 10 shown in FIGS. 1 and 2, that is not required.

The catheter body 102 is formed of a biocompatible and biostable primary polymeric material 107 that has a cross-sectional thickness extending outwardly from the lumen 106 to the outer wall 104. Suitable biocompatible and biostable primary polymeric materials are similar to those described above for polymeric material 17 shown in FIGS. 1, 1A, 2 and 3.

As shown in the exemplary embodiment of FIGS. 4 to 7, a third core wire 120 and a fourth core wire 122 are encased or otherwise embedded in the primary polymeric material 107. The third core wire 120 is, for example, of stainless steel or nitinol and extends along a longitudinal axis that is parallel to the axis B-B of the catheter 100. The third core wire 120 has a third core wire proximal end 120A extending to a third core wire distal end 120B. Similarly, the fourth core wire 122 is, for example, of stainless steel or nitinol and extends longitudinally along an axis that is parallel to the axis B-B of the catheter 100 and the longitudinal axis of the third core wire 120. The fourth core wire 122 has a fourth core wire proximal end 122A extending to a fourth core wire distal end 122B.

Figure 5:
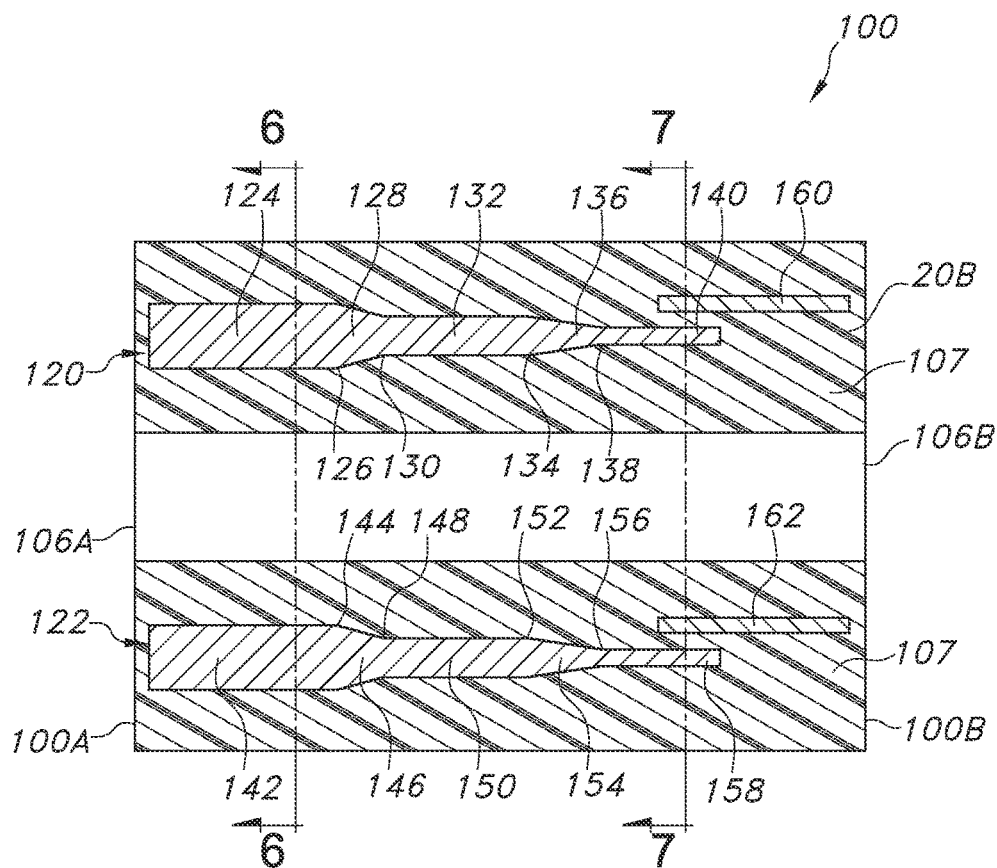
FIG. 5 is a cross-sectional view of the catheter 100 shown in FIG. 4.
Figure 6:
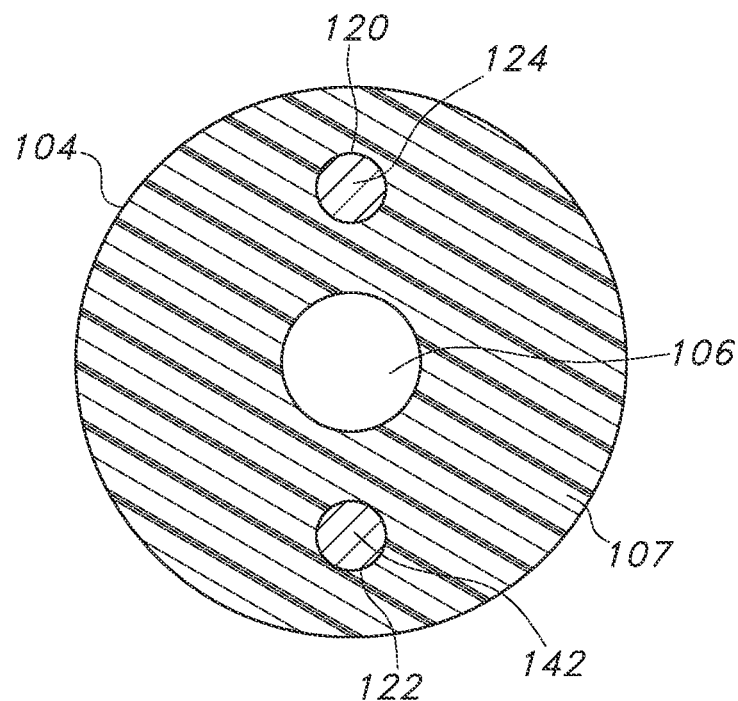
FIG. 6 is a cross-sectional view taken along line 6-6 of FIG. 4.

As shown in the cross-sections of FIGS. 5 and 6, the third core wire 120 has a seventh cylindrically-shaped portion 124 of a seventh circular transverse cross-section of a seventh constant diameter that ranges from about 1 mm to about 3 mm. At cross-sectional location 126, the seventh cylindrical portion 124 meets a fifth tapered portion 128 that tapers downwardly and distally along the longitudinal axis of the core wire 120 towards cross-sectional location 130 where an eighth cylindrically-shaped portion 132 begins. The eighth cylindrically-shaped portion 132 is of an eighth circular transverse cross-section of an eighth constant diameter that is less than the seventh constant diameter and ranges from about 0.8 mm to about 0.2 mm. At cross-sectional location 134, the eighth cylindrical portion 132 meets a sixth tapered portion 136 that tapers downwardly and distally along the longitudinal axis towards cross-sectional location 138 where a ninth ribbon-shaped portion 140 begins. The ninth ribbon-shaped portion 140 has a rectangular shape in cross-section (FIG. 7) with opposed major planar surfaces 140A, 140B extending to and meeting spaced apart edges 140C, 140D. The planar surfaces have a length from about 3 mm to about 30 mm and a width from about 0.6 mm to about 0.005 mm.

The cross-section of FIG. 5 further shows that the fourth core wire 122 has a tenth cylindrically-shaped portion 142 of a tenth circular transverse cross-section of a tenth constant diameter that ranges from about 1 mm to about 3 mm. At cross-sectional location 144, the tenth cylindrical portion 142 meets a seventh tapered portion 146 that tapers downwardly and distally along the longitudinal axis of the core wire 122 towards cross-sectional location 148 where an eleventh cylindrically-shaped portion 150 begins. The eleventh cylindrically-shaped portion 150 is of an eleventh circular transverse cross-section of an eleventh constant diameter that is less than the tenth constant diameter and ranges from about 0.8 mm to about 0.2 mm. At cross-sectional location 152, the eleventh cylindrical portion 150 meets an eighth tapered portion 154 that tapers downwardly and distally along the longitudinal axis towards cross-sectional location 156 where a twelfth ribbon-shaped portion 158 begins. The twelfth ribbon-shaped portion 158 has a rectangular shape in cross-section (FIG. 7) with opposed major surfaces 158A, 158B extending to and meeting spaced apart edges 158C, 158D.

Preferably the proximal end 120A of the seventh cylindrical portion 124, which is the proximal end of the third core wire 120, is distal the catheter proximal end 100A a distance of from about 2 mm to about 5 mm while the distal end 120B of the ninth ribbon-shaped portion 140, which is the distal end of the third core wire 120, is proximal the catheter distal end 100B a distance of from about 5 mm to about 50 mm. In a similar manner, it is preferred that the proximal end 122A of the tenth cylindrical portion 142, which is the proximal end of the fourth core wire 122, is distal the catheter proximal end 100A a distance of from about 2 mm to about 5 mm while the distal end 122B of the twelfth ribbon-shaped portion 158, which is the distal end of the fourth core wire 122, is proximal the catheter distal end 10B a distance of from about 5 mm to about 50 mm.

Figure 4:
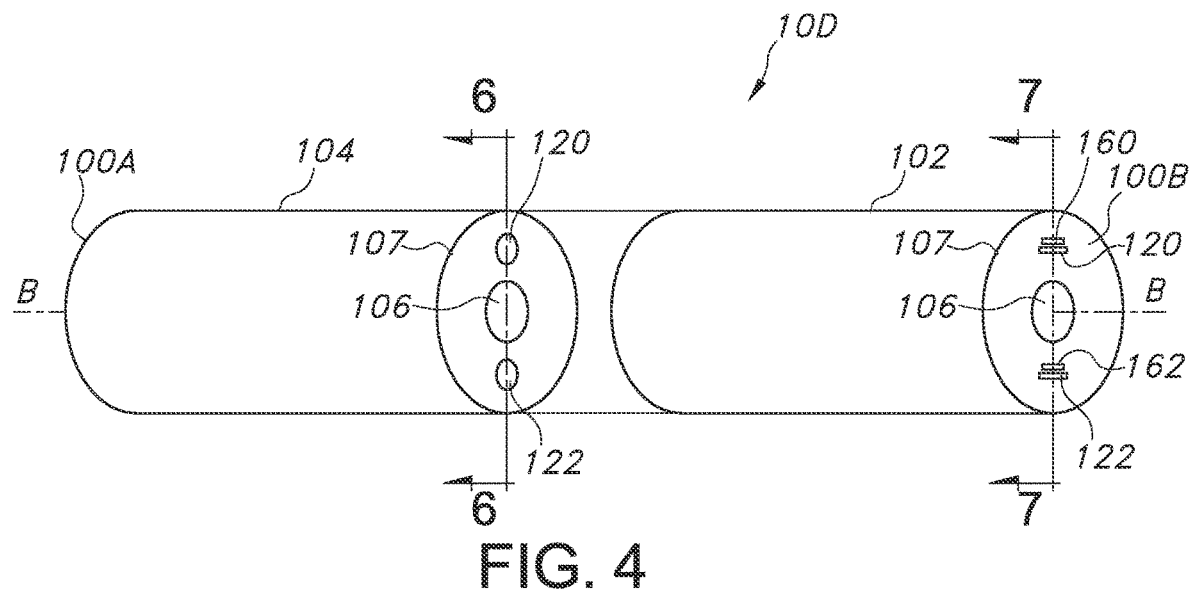
FIG. 4 is a broken, cross-sectional view of a catheter 100 comprising spaced apart core wires 120 and 122 on opposite sides of a primary lumen 106 where the core wires are provided with corresponding distal shaping ribbon 160 and 162.
Figure 7:
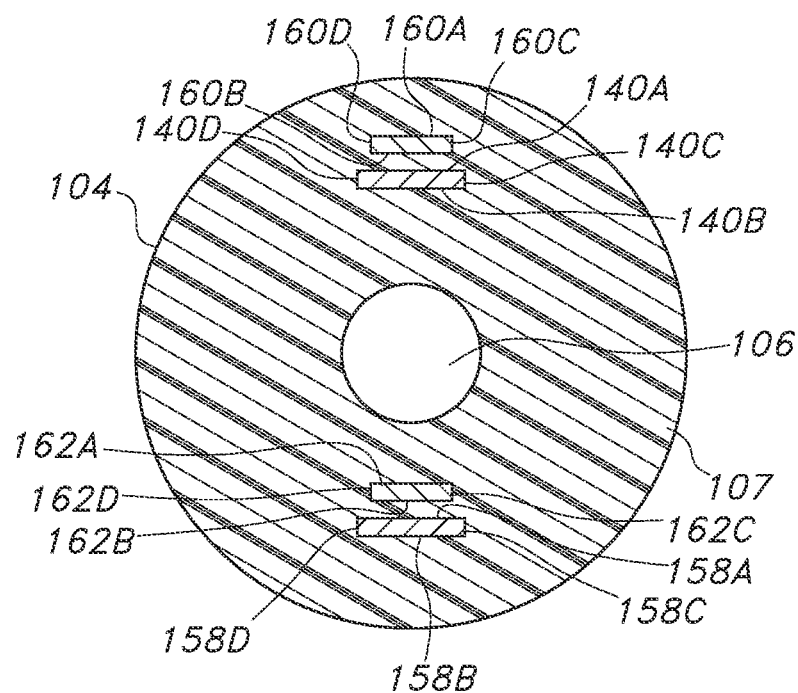
FIG. 7 is a cross-sectional view taken along line 7-7 of FIG. 4.

FIGS. 4, 5 and 7 further illustrate that a shaping ribbon 160 is provided in the primary polymeric material 107 adjacent to the ninth ribbon-shaped portion 140 of the third core wire 120. The shaping ribbon 160 is, for example, of stainless steel or nitinol and spaced from but in an overlapping relationship with a distal portion of the ninth ribbon-shaped portion 140 (FIG. 7). The shaping ribbon 160, which terminates a relatively short distance of from about 2 mm to about 5 mm proximal the distal end 100B of the catheter 100, has a length of about 3 mm to about 30 mm and a rectangular shape in cross-section with opposed major planar surfaces 160A, 1608 extending to and meeting spaced apart edges 160C, 160D. The planar surfaces have a length from about 3 mm to about 30 mm and a width from about 0.6 mm to about 0.005 mm. As shown in FIG. 7, the major planar surfaces 160A, 160B are parallel to each other and parallel to the major planar surfaces 140A and 140B of the ninth ribbon-shaped portion 140 of the third core wire 120.

FIGS. 4, 5 and 7 further illustrate that a shaping ribbon 162 is provided in the primary polymeric material 107 adjacent to the twelfth ribbon-shaped portion 158 of the fourth core wire 122. The shaping ribbon 162 is, for example, of stainless steel or nitinol and spaced from but in an overlapping relationship with a distal portion of the twelfth ribbon-shaped portion 158. The shaping ribbon 162, which terminates a relatively short distance of from about 2 mm to about 5 mm proximal the distal end 100B of the catheter 100, has a rectangular shape in cross-section with opposed major planar surfaces 162A, 162B extending to and meeting spaced apart edges 162C, 162D. The planar surfaces have a length from about 3 mm to about 30 mm and a width from about 0.6 mm to about 0.005 mm. As shown in FIG. 7, the major planar surfaces 162A, 162B are parallel to each other and parallel to the major planar surfaces 158A and 158B of the twelfth ribbon-shaped portion 158 of the fourth core wire 122.

Thus, the distance from the catheter proximal end 100A to the proximal ends of the third and fourth core wires 120, 122 ranges from about 2 mm to about 5 mm. Similarly, the distance from the catheter distal end 100B to the distal ends of the third and fourth core wires 120, 122 ranges from about 5 mm to about 50 mm. That way, the proximal end 120A of the seventh cylindrical portion 124 and the distal end 120B of the ninth ribbon-shaped portion 140 of the third core wire 120, and the proximal end 122A of the tenth cylindrical portion 142 and the distal end 122B of the twelfth ribbon-shaped portion 158 of the fourth core wire 122 are encased or embedded in the primary polymeric material 107 of the catheter 100. Further, as shown in FIG. 7, the shaping ribbon 160 resides between the core wire 120 and the outer wall 104 of the catheter 100 while the shaping ribbon 162 resides between the core wire 122 and the lumen 106. The distance from the catheter distal end 100B to the distal ends of the shaping ribbons 160 and 162 ranges from about 2 mm to about 5 mm. Having a sufficient length of primary polymeric material between the distal end 100B of the catheter and the distal ends of the third and fourth core wires 120 and 122 and between their corresponding shaping ribbons helps prevent the third and fourth core wires 120, 122 and their shaping ribbons 160 and 162 from puncturing through the primary polymeric material 107 and becoming exposed, which is undesirable.

The shaping ribbons 160 and 162 have sufficient of ductility that allows them to be bent into a desired deflection angle and to hold the angle. This is helpful when the catheter 100 is intended to be used in a medical procedure where the vasculature leading to the target site has a generally known approach angle.

Figure 8:
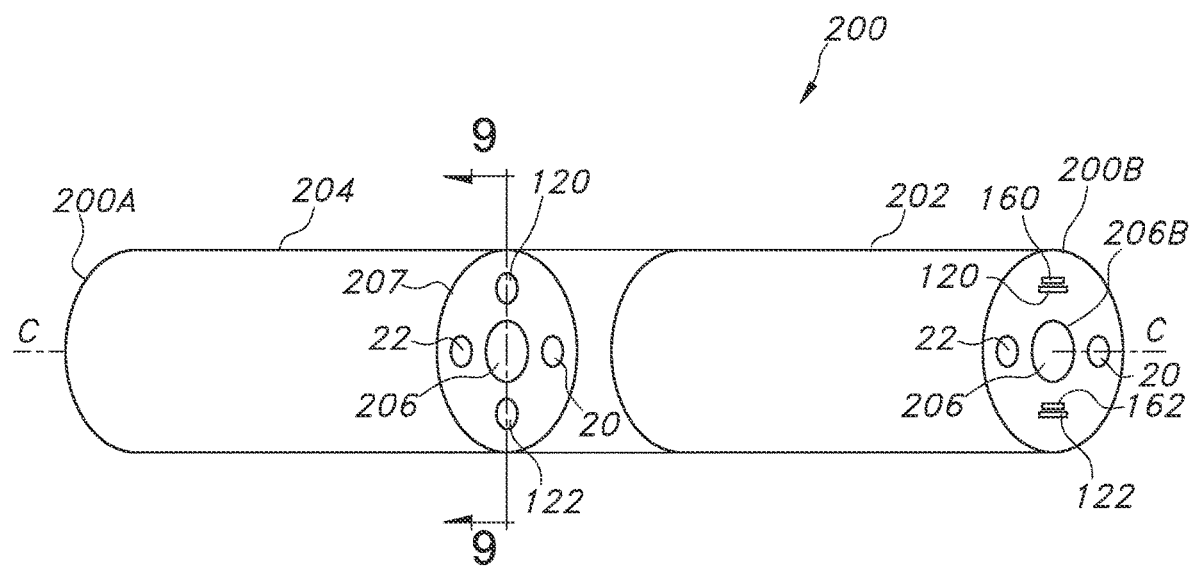
FIG. 8 is a broken, cross-sectional view of a catheter 200 comprising a first pair of spaced apart core wires 20 and 22 on opposite sides of a primary lumen 206 and a second pair of cores 120 and 122 on opposite sides of the primary lumen, the second pair of core wires spaced 90° from the first pair and being provided with corresponding distal shaping ribbon 160 and 162.
Figure 9:
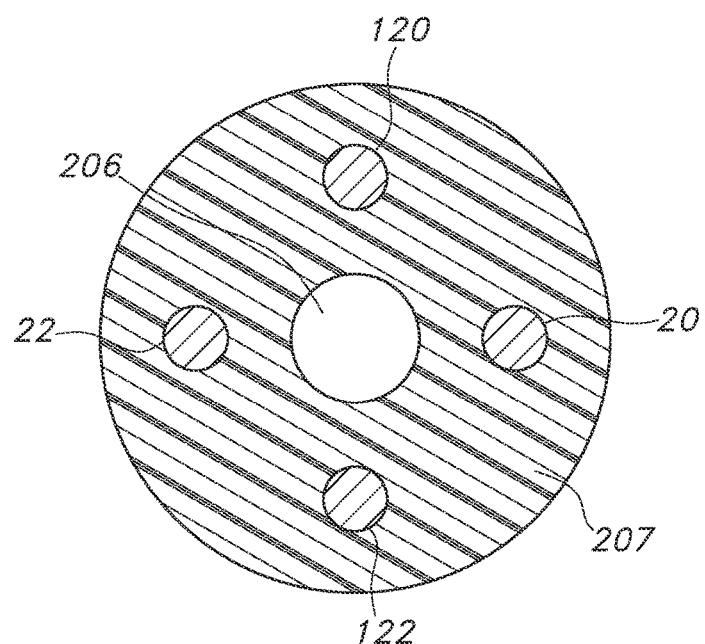
FIG. 9 is a cross-sectional view taken along line 9-9 of FIG. 8.

FIGS. 8 and 9 illustrate another embodiment of a catheter 200 according to the present invention. Catheter 200 is a hybrid of catheters 10 and 100 and comprises a cylindrically-shaped catheter body 202 having an outer wall 204 extending along a longitudinal axis C-C from a catheter proximal end 200A to a catheter distal end 200B. The catheter 200 has a primary lumen 206 that is in open communication with a proximal opening (not shown) at the catheter proximal end 200A and a distal opening 206B at the catheter distal end 200B. Preferably the catheter lumen 206 has a cylindrical shape throughout its length extending to the proximal and distal openings, but, as described above with respect to the catheter 10 shown in FIGS. 1 and 2, that is not required.

The catheter body 202 is formed of a biocompatible and biostable primary polymeric material 207 that has a cross-sectional thickness extending outwardly from the lumen 206 to the outer wall 204. Suitable biocompatible and biostable primary polymeric materials are similar to those described above for polymeric material 17 shown in FIGS. 1, 1A, 2 and 3.

The first core wire 20 and the second core wire 22 shown in FIGS. 1 and 2 are encased or embedded in the primary polymeric material 207. The primary lumen 206 is intermediate the diametrically opposed first and second core wires 20 and 22. Further, the third and fourth core wires 120 and 122 shown in FIGS. 4 to 7 are encased or embedded in the primary polymeric material 207 and diametrically opposed to each other. The third and fourth core wires 120 and 122 are also provided with corresponding stainless steel or nitinol shaping ribbons 160 and 162. The primary lumen 206 is intermediate the third and fourth core wires 120 and 122. Moreover, FIG. 8 shows that the third, first, fourth and second core wires 120, 20, 122 and 22 and their corresponding shaping ribbons 160 and 162 reside at respective 0°, 90°, 180° and 270° locations about the circumference of the primary lumen 206.

While not shown in FIGS. 8 and 9, the proximal ends of the core wires 20, 22, 120 and 122 are spaced distally from the proximal end 200A of the catheter. Further, the distal ends of the core wires 20, 22, 120 and 222 are spaced proximally from the distal end 200B of the catheter. The core wires 120 and 122 are provided with corresponding stainless steel or nitinol shaping ribbons 160 and 162 which are also spaced proximally from the distal end 200B of the catheter. This spacing, which was previously described with respect to the catheters 10 and 100, helps prevent the core wires 20, 22, 120 and 122 and the shaping ribbons 160 and 162 from penetrating through the primary polymeric material.

Figure 10:
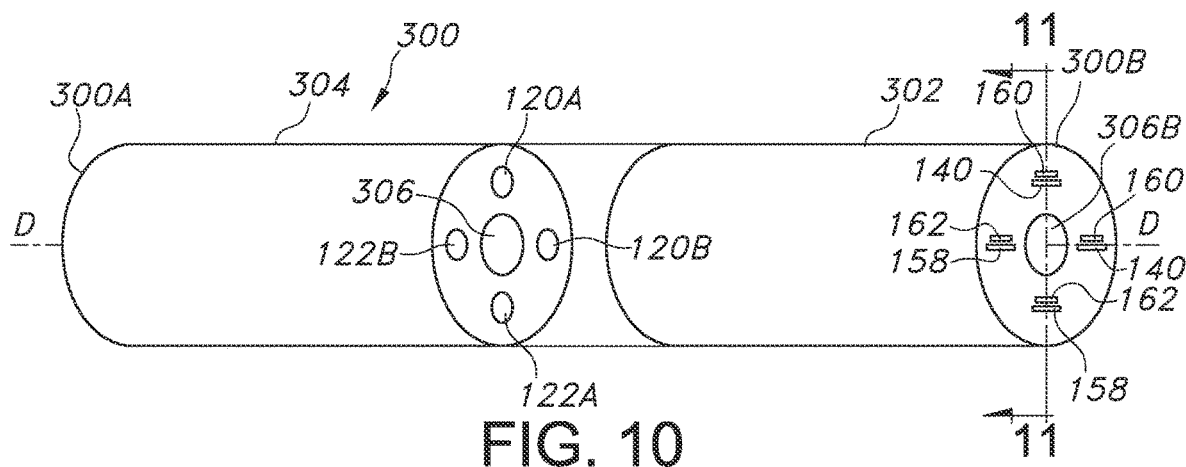
FIG. 10 is a broken, cross-sectional view of a catheter 300 comprising a first pair of spaced apart core wires 120A and 122A on opposite sides of a primary lumen 306 where the core wires are provided with corresponding distal shaping ribbons 160 and 162 and a second pair of cores 120B and 122B on opposite sides of the primary lumen, the second pair spaced 90° from the first pair and being provided with corresponding distal shaping ribbons 160 and 162.
Figure 11:
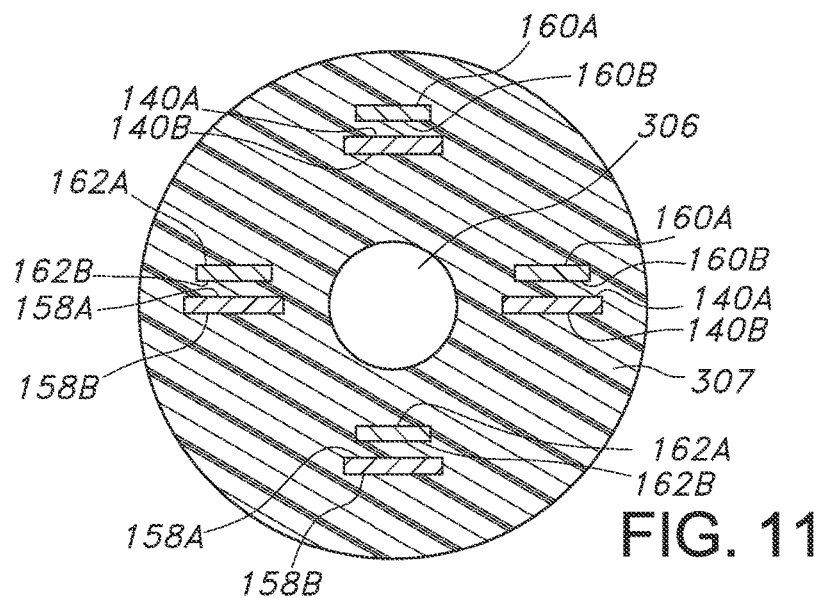
FIG. 11 is a cross-sectional view taken along line 11-11 of FIG. 10.

FIGS. 10 and 11 illustrate another embodiment of a catheter 300 according to the present invention. Catheter 300 comprise a cylindrically-shaped catheter body 302 having an outer wall 304 extending along a longitudinal axis D-D from a catheter proximal end 300A to a catheter distal end 300B. The catheter 300 has a primary lumen 306 that is in open communication with a proximal opening (not shown) at the catheter proximal end 300A and a distal opening 306B at the catheter distal end 300B. Preferably the catheter lumen 306 has a cylindrical shape throughout its length extending to the proximal and distal openings, but, as described above with respect to the catheter 10 shown in FIGS. 1 and 2, that is not required.

The catheter body 302 is formed of a biocompatible and biostable primary polymeric material 307 that has a cross-sectional thickness extending outwardly from the lumen 306 to the outer wall 304. Suitable biocompatible and biostable primary polymeric materials are similar to those described above for polymeric material 17 shown in FIGS. 1, 1A, 2 and 3.

A first diametrically opposed pair of the third and fourth core wires 120A and 122A shown in FIGS. 4 to 7 is encased or embedded in the primary polymeric material 307. The primary lumen 306 is intermediate the first pair of core wires 120A and 122A. A second diametrically opposed pair of the third and fourth core wires 120B and 122B is encased or embedded in the primary polymeric material 307 with the primary lumen 206 residing intermediate the second pair.

FIGS. 10 and 11 illustrate that a first pair of the stainless steel or nitinol shaping ribbons 160 and 162 is provided in the primary polymeric material 307 adjacent to the respective ninth ribbon-shaped portion 140 of the third core wire 120A and the twelfth ribbon-shaped portion 158 of the fourth core wire 122A of the first pair. In the first pair, the shaping ribbon 160 is spaced from but in an overlapping relationship with the distal portion of the ninth ribbon-shaped portion 140. The shaping ribbon 160 terminates a relatively short distance proximal the distal end 300B of the catheter 300 and has a rectangular shape in cross-section with opposed major planar surfaces 160A, 160B extending to and meeting spaced apart edges 160C, 160D (FIG. 7). The major planar surfaces 160A, 160B are parallel to each other and parallel to the major planar surfaces 140A and 140B of the ninth ribbon-shaped portion 140 of the third core wire 120A. The planar surfaces have a length from about 3 mm to about 30 mm and a width from about 0.6 mm to about 0.005 mm.

Further, the shaping ribbon 162 is spaced from but in an overlapping relationship with the distal portion of the twelfth ribbon-shaped portion 158 of the fourth core wire 122A of the first pair. The shaping ribbon 162 terminates a relatively short distance proximal the distal end 300B of the catheter 300 and has a rectangular shape in cross-section with opposed major planar surfaces 162A, 162B extending to and meeting spaced apart edges 162C, 162D (FIG. 7). The major planar surfaces 162A, 162B are parallel to each other and parallel to the major planar surfaces 158A and 158B of the twelfth ribbon-shaped portion 158 of the fourth core wire 122A of the first pair. The planar surfaces have a length from about 3 mm to about 30 mm and a width from about 0.6 mm to about 0.005 mm.

FIGS. 10 and 11 further illustrate that a second pair of the stainless steel or nitinol shaping ribbons 160 and 162 is provided in the primary polymeric material 307 adjacent to the respective ninth ribbon-shaped portion 140 and the twelfth ribbon-shaped portion 158 of the second pair of the third and fourth core wires 120B and 122B. In the second pair, the shaping ribbon 160 is spaced from but in an overlapping relationship with the distal portion of the ninth ribbon-shaped portion 140. The shaping ribbon 160 terminates a relatively short distance proximal the distal end 300B of the catheter 300 and has a rectangular shape in cross-section with opposed major planar surfaces 160A, 160B extending to and meeting spaced apart edges 160C, 160D (FIG. 7). In the second pair of shaping ribbons, the major planar surfaces 160A, 160B are parallel to each other and parallel to the major planar surfaces 140A and 140B of the ninth ribbon-shaped portion 140 of the third core wire 120B. The planar surfaces have a length from about 3 mm to about 30 mm and a width from about 0.6 mm to about 0.005 mm.

In the second pair, the shaping ribbon 162 is spaced from but in an overlapping relationship with the distal portion of the twelfth ribbon-shaped portion 158. The shaping ribbon 162 terminates a relatively short distance proximal the distal end 300B of the catheter 300 and has a rectangular shape in cross-section with opposed major planar surfaces 162A, 162B extending to and meeting spaced apart edges 162C, 162D (FIG. 7). The major planar surfaces 162A, 162B are parallel to each other and parallel to the major planar surfaces 158A and 158B of the twelfth ribbon-shaped portion 158 of the fourth core wire 122. The planar surfaces have a length from about 3 mm to about 30 mm and a width from about 0.6 mm to about 0.005 mm.

A characteristic of the catheter 300 shown in FIGS. 10 and 11 is that the planar surfaces of the ribbon-shaped portions 140 and 158 of the first and second pairs of the third and fourth core wires 120A, 120B and 122A, 122B and their corresponding shaping ribbons 160 and 162 are parallel to each other. This contrasts with the embodiment shown in FIG. 12 where the planar surfaces of the ribbon-shaped portions 140 and 158 of the first pair of core wires 120A and 122A and their corresponding shaping ribbons 160 and 162 are aligned perpendicular to the planar surfaces of the ribbon-shaped portions 140 and 158 of the second pair of core wires 120B and 122B and their corresponding shaping ribbons 160 and 162. If desired, however, the angle between the planar surfaces of the ribbon-shaped portions 140 and 158 of the first pair of core wires 120A and 122A and their corresponding shaping ribbons 160 and 162 with respect to the planar surfaces of the ribbon-shaped portions 140 and 158 of the second pair of core wires 120B and 122B and their corresponding shaping ribbons 160 and 162 can be other than perpendicular. The relative angle can range from about 1° to about 89°.

FIGS. 13 to 16 illustrate another embodiment of a catheter 400 according to the present invention. Catheter 400 comprises a cylindrically-shaped catheter body 402 having an outer wall 404 extending along a longitudinal axis E-E from a catheter proximal end 400A to a catheter distal end 400B. The catheter 400 has a primary lumen 406 that is in open communication with a proximal opening 406A at the catheter proximal end 400A and a distal opening 406B at the catheter distal end 400B. The catheter body 402 is formed of a biocompatible and biostable primary polymeric material 407 that extends outwardly from the lumen 406 to the outer wall 404. Suitable biocompatible and biostable primary polymeric materials are similar to those described above for polymeric material 17 shown in FIGS. 1, 1A, 2 and 3. Preferably the catheter lumen 406 has a cylindrical shape throughout its length extending to the proximal and distal openings, but, as described above with respect to the catheter 10 shown in FIGS. 1 and 2, that is not required.

A first diametrically opposed pair of the third and fourth core wires 120C and 122C and their corresponding shaping ribbons 160 and 162, as shown in FIGS. 4 to 7, is first coated in with a secondary polymeric material 420 and this assembly is encased or embedded in the primary polymeric material 407. Suitable polymeric materials for coating 420 are PTFE and polyimide. The primary lumen 406 is intermediate the first pair of core wires 120C and 122C. A second diametrically opposed pair of the third and fourth core wires 120D and 122D and their corresponding shaping ribbons 160 and 162 is also coated with a secondary polymeric material 422, which is similar to the polymeric coating 420, and this assembly is encased or embedded in the primary polymeric material 407 with the primary lumen 406 residing intermediate the second pair.

Preferably, the secondary polymeric coatings 420 and 422 provide the respective coated assemblies with a uniform cross-sectional diameter extending from the proximal ends of the first pair of the third and fourth core wires 120C and 122C to the distal ends of their corresponding shaping ribbons 160 and 162, and from the proximal ends of the second pair of the third and fourth core wires 120D and 122D to the distal ends of their corresponding shaping ribbons 160 and 162. However, the cross-sectional diameters of the first pair of the coated core wires 120C and 122C and their shaping ribbons need not be the same as that of the second pair of the coated core wires 120D and 122D and their corresponding shaping ribbons 16 and 162.

The first pair of shaping ribbons 160 and 162 is provided adjacent to the respective ninth ribbon-shaped portion 140 of the third core wire 120C and the twelfth ribbon-shaped portion 158 of the fourth core wire 122C. In the first pair, the shaping ribbon 160 is spaced from but in an overlapping relationship with the distal portion of the ninth ribbon-shaped portion 140. The shaping ribbon 160 terminates a relatively short distance proximal the distal end 400B of the catheter 400 and has a rectangular shape in cross-section with opposed major planar surfaces 160A, 160B extending to and meeting spaced apart edges 160C, 160D (FIG. 7). The major planar surfaces 160A, 160B are parallel to each other and parallel to the major planar surfaces 140A and 140B of the ninth ribbon-shaped portion 140 of the third core wire 120C of the first pair. The planar surfaces have a length from about 3 mm to about 30 mm and a width from about 0.6 mm to about 0.005 mm.

Further, the shaping ribbon 162 is spaced from but in an overlapping relationship with the distal portion of the twelfth ribbon-shaped portion 158 of the fourth core wire 122C of the first pair. The shaping ribbon 162 terminates a relatively short distance proximal the distal end 400B of the catheter 400 and has a rectangular shape in cross-section with opposed major planar surfaces 162A, 162B extending to and meeting spaced apart edges 162C, 162D (FIG. 7). The major planar surfaces 162A, 162B are parallel to each other and parallel to the major planar surfaces 158A and 158B of the twelfth ribbon-shaped portion 158 of the fourth core wire 122C. The planar surfaces have a length from about 3 mm to about 30 mm and a width from about 0.6 mm to about 0.005 mm.

FIGS. 13 to 16 further illustrate that the second pair of shaping ribbons 160 and 162 is provided adjacent to the respective ninth ribbon-shaped portion 140 and the twelfth ribbon-shaped portion 158 of the second pair of the third and fourth core wires 120D and 122D. In the second pair, the shaping ribbon 160 is spaced from but in an overlapping relationship with the distal portion of the ninth ribbon-shaped portion 140. The shaping ribbon 160 terminates a relatively short distance proximal the distal end 400B of the catheter 400 and has a rectangular shape in cross-section with opposed major planar surfaces 160A, 160B extending to and meeting spaced apart edges 160C, 160D (FIG. 7). In the second pair of shaping ribbons, the major planar surfaces 160A, 160B are parallel to each other and parallel to the major planar surfaces 140A and 140B of the ninth ribbon-shaped portion 140 of the third core wire 120B. The planar surfaces have a length from about 3 mm to about 30 mm and a width from about 0.6 mm to about 0.005 mm.

Further, in the second pair, the shaping ribbon 162 is spaced from but in an overlapping relationship with the distal portion of the twelfth ribbon-shaped portion 158. The shaping ribbon 162 terminates a relatively short distance proximal the distal end 400B of the catheter 400 and has a rectangular shape in cross-section with opposed major planar surfaces 162A, 162B extending to and meeting spaced apart edges 162C, 162D (FIG. 7). The major planar surfaces 162A, 162B are parallel to each other and parallel to the major planar surfaces 158A and 158B of the twelfth ribbon-shaped portion 158 of the fourth core wire 122D of the second pair. The planar surfaces have a length from about 3 mm to about 30 mm and a width from about 0.6 mm to about 0.005 mm.

Figure 12:
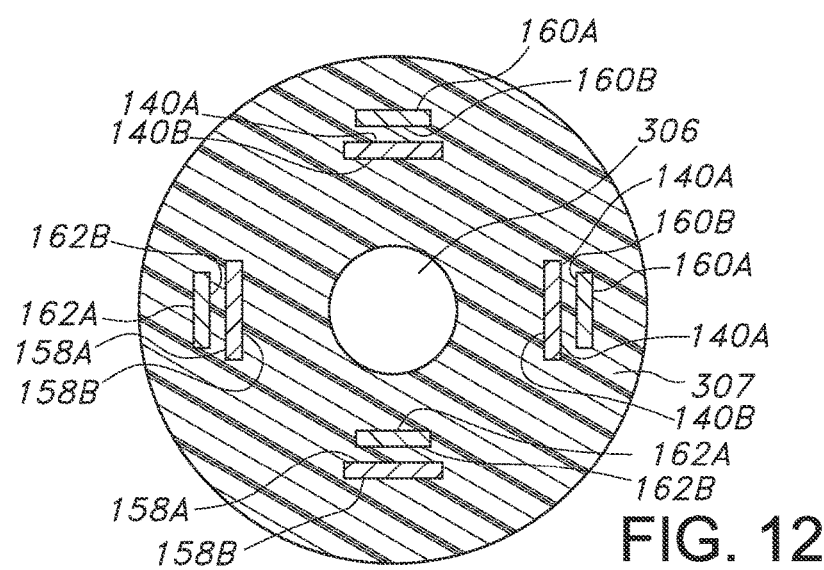
FIG. 12 is a cross-sectional view similar to that of FIG. 11, but with the second pair of core wires and their corresponding shaping ribbons 160 and 162 having been rotated 90°.
Figure 13:
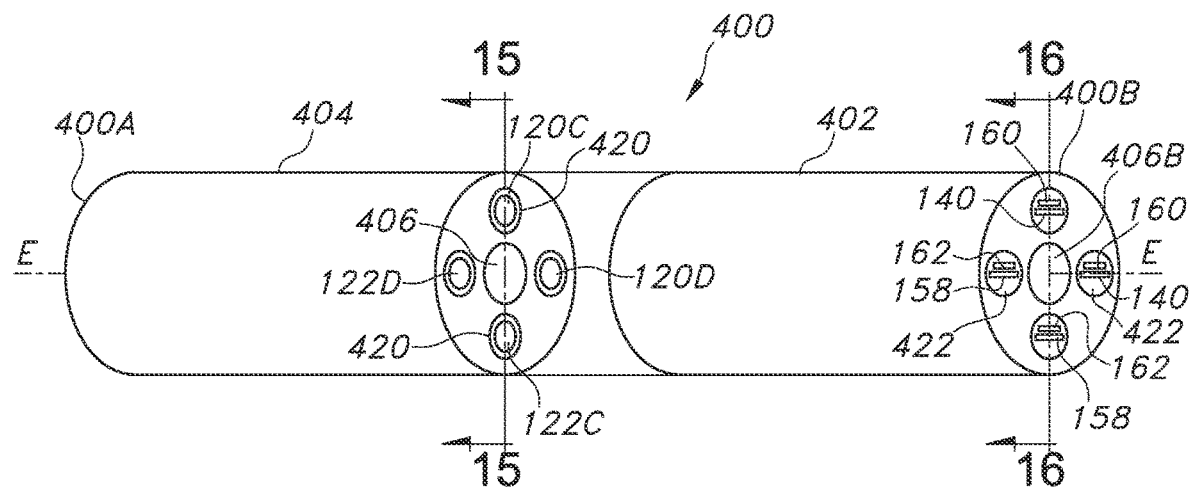
FIG. 13 is a broken, perspective view of a catheter 400 comprising a first pair of spaced apart core wires 120C and 122C coated with polymeric materials 420 and being disposed on opposite sides of a primary lumen 406 where the core wires are provided with corresponding distal shaping ribbon 160 and 162, and a second pair of cores 120D and 122D coated with polymeric materials 422 and disposed on opposite sides of the primary lumen, the second pair spaced 90° from the first pair and being provided with corresponding distal shaping ribbons 160 and 162.
Figure 14:
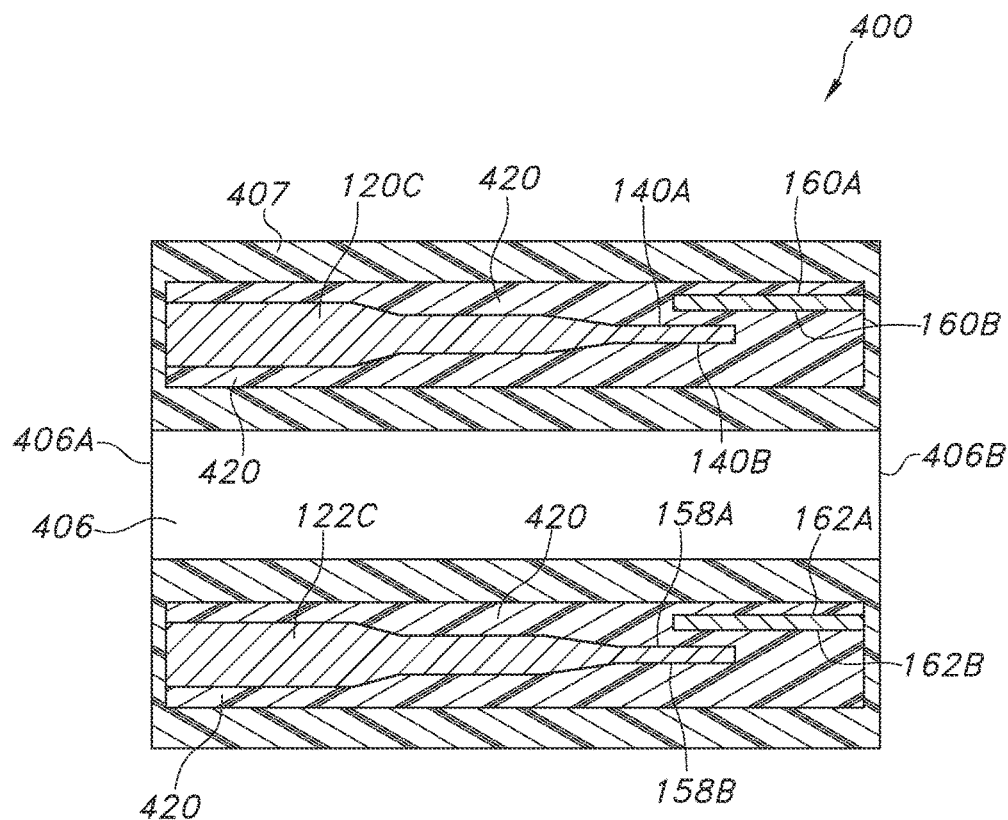
FIG. 14 is a cross-sectional view of the catheter 400 shown in FIG. 13.
Figure 15:
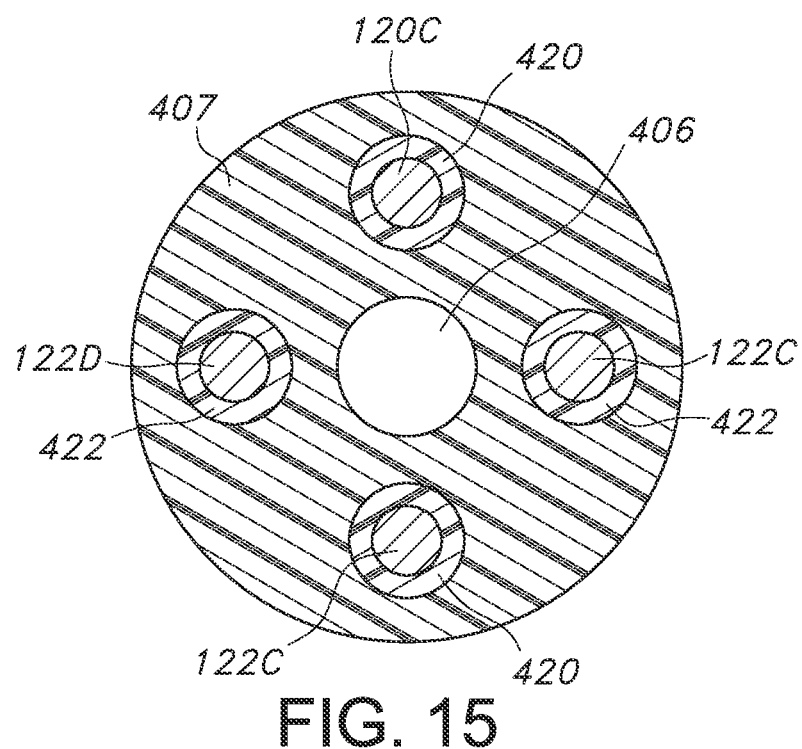
FIG. 15 is a cross-sectional view taken along line 15-15 of FIG. 13.
Figure 16:
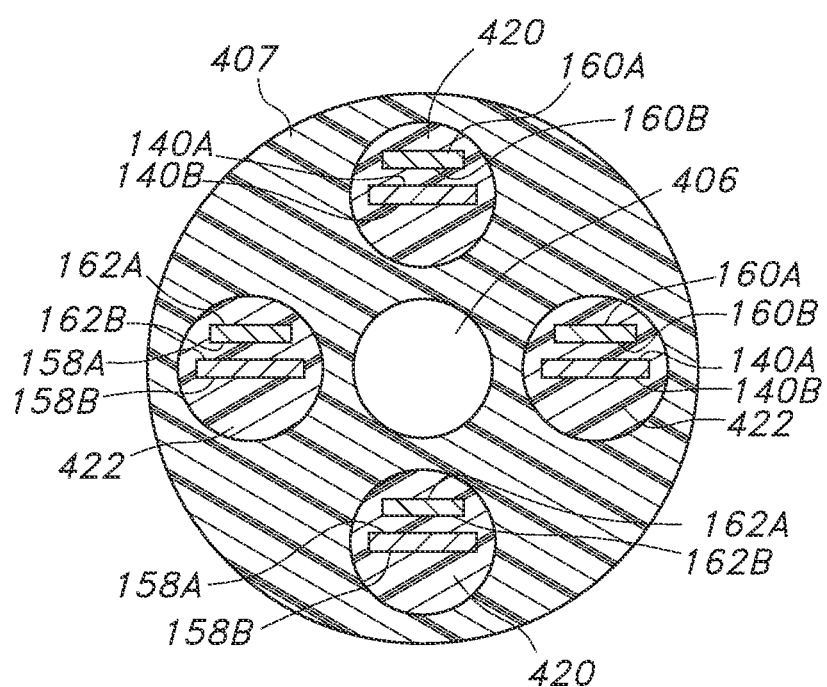
FIG. 16 is a cross-sectional view taken along line 16-16 of FIG. 13.

A characteristic of the catheter 400 shown in FIGS. 13 to 16 is that the planar surfaces of the first and second pairs of the third and fourth core wires 120C, 122C and 120D, 122D and their corresponding shaping ribbons 160 and 162 are parallel to each other. However, in a similar manner as shown in the embodiment of FIG. 12, the planar surfaces of the first pair of core wires 120C and 122C and their corresponding shaping ribbons 160 and 162 can be aligned perpendicular to the planar surfaces of the second pair of core wires 120D and 122D and their corresponding shaping ribbons 160 and 162. If desired, however, the angle between the planar surfaces of the ribbon-shaped portions 140 and 158 of the first pair of core wires 120C and 122C and their corresponding shaping ribbons 160 and 162 with respect to the planar surfaces of the ribbon-shaped portions 140 and 158 of the second pair of core wires 120D and 122D and their corresponding shaping ribbons 160 and 162 can be other than perpendicular. The relative angle can range from about 1° to about 89°.

Figure 17:
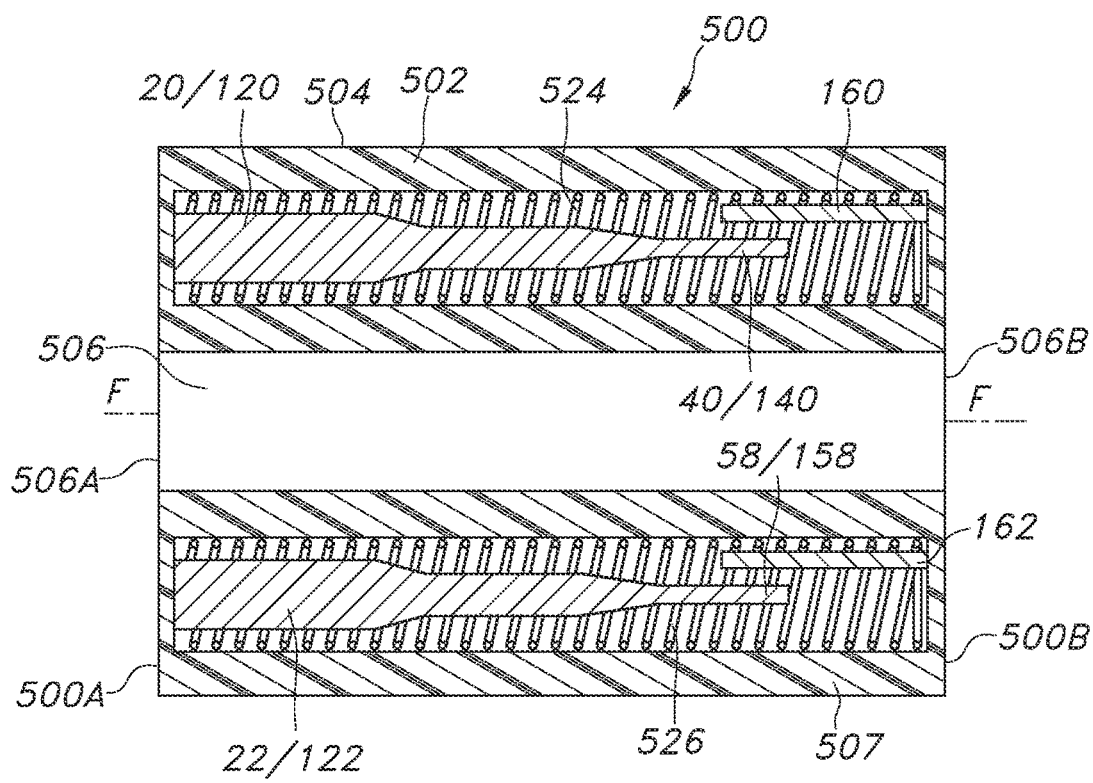
FIG. 17 is a cross-sectional view of a catheter 500 that is similar to the catheter 400 shown in FIG. 14 except that instead of being coated with a polymeric material, the core wires 120 and 122 and their corresponding shaping ribbons 160 and 162 are disposed inside corresponding coil springs 524 and 526.

FIG. 17 is a cross-section of another embodiment of a catheter 500 according to the present invention. Catheter 500 comprises a cylindrically-shaped catheter body 502 having an outer wall 504 extending along a longitudinal axis F-F from a catheter proximal end 500A to a catheter distal end 500B. The catheter 500 has a primary lumen 506 that is in open communication with a proximal opening 506A at the catheter proximal end 500A and a distal opening 506B at the catheter distal end 500B. The catheter body 502 is formed of a biocompatible and biostable polymeric material 507 that extends outwardly from the lumen 506 to the outer wall 504. Preferably the catheter lumen 506 has a cylindrical shape throughout its length extending to the proximal and distal openings, but, as described above with respect to the catheter 10 shown in FIGS. 1 and 2, that is not required. Suitable biocompatible and biostable primary polymeric materials are similar to those described above for polymeric material 17 shown in FIGS. 1, 1A, 2 and 3.

FIG. 17 further shows that the first and second core wires 20 or 120 and 22 or 122 and their corresponding shaping ribbons 160 and 162 are disposed inside respective helically-wound coil springs 524 and 526. The coil springs 524 and 526 extend from the proximal ends of the third and fourth core wires 120 and 122 to the distal ends of their corresponding shaping ribbons 160 and 162. The coil springs 524 and 526 are, for example, of stainless steel or nitinol and serve as respective sleeves having a generally circular transverse cross-section of substantially constant outer diameter in the range of about 0.2 mm to about 0.5 mm.

If the first and second core wires are 20 and 22 respectively, then they have cylindrically-shaped distal portions 40 and 58. On the other hand, if they are 120 and 122 respectively, then they have ribbon-shaped portion 140 and 158.

Figure 18:
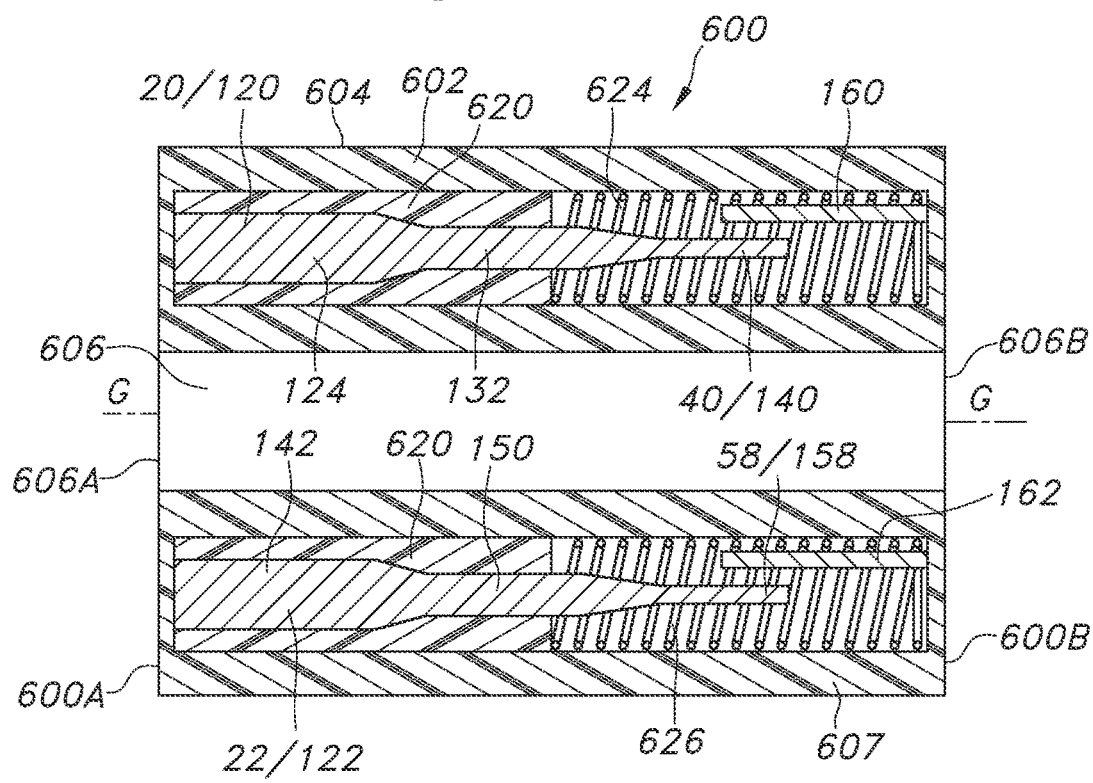
FIG. 18 is a cross-sectional view of a catheter 600 that is similar to the catheter 400 shown in FIG. 14 except that only a proximal portion of the core wires is coated with a polymeric material 620 and 622 while the distal portion of the core wires 120 and 122 and their corresponding shaping ribbons 160 and 162 is disposed inside a corresponding coil spring 624 and 626.

FIG. 18 is a cross-section of another embodiment of a catheter 600 according to the present invention. Catheter 600 comprises a cylindrically-shaped catheter body 602 having an outer wall 604 extending along a longitudinal axis G-G from a catheter proximal end 600A to a catheter distal end 600B. The catheter 600 has a primary lumen 606 that is in open communication with a proximal opening 606A at the catheter proximal end 600A and a distal opening 606B at the catheter distal end 600B. The catheter body 602 is formed of a biocompatible and biostable polymeric material 607 that extends outwardly from the lumen 606 to the outer wall 604. Suitable biocompatible and biostable primary polymeric materials are similar to those described above for polymeric material 17 shown in FIGS. 1, 1A, 2 and 3. Preferably the catheter lumen 606 has a cylindrical shape throughout its length extending to the proximal and distal openings, but, as described above with respect to the catheter 10 shown in FIGS. 1 and 2, that is not required.

FIG. 18 further shows that the first and second core wires 20 or 120 and 22 or 122 are coated with the secondary polymeric material 620 for a portion of their lengths in a similar manner as shown with the catheter 400 of FIGS. 13 to 16. Suitable polymeric materials for coating 620 are PTFE and polyimide. The secondary polymeric coating 620 extends from the proximal ends of the respective seventh and tenth cylindrical portions 124 and 142 to a location somewhere along the length of the respective eighth and eleventh cylindrical portions 132 and 150. Respective helically-wound coil springs 624 and 626, for example of stainless steel or nitinol, then extend from the distal ends of the polymeric coatings 620 to the distal ends of the respective shaping ribbons 160 and 162.

If the first and second core wires are 20 and 22 respectively, then they have cylindrically-shaped distal portions 40 and 58. On the other hand, if they are 120 and 122 respectively, then they have ribbon-shaped portion 140 and 158.

Figure 19:
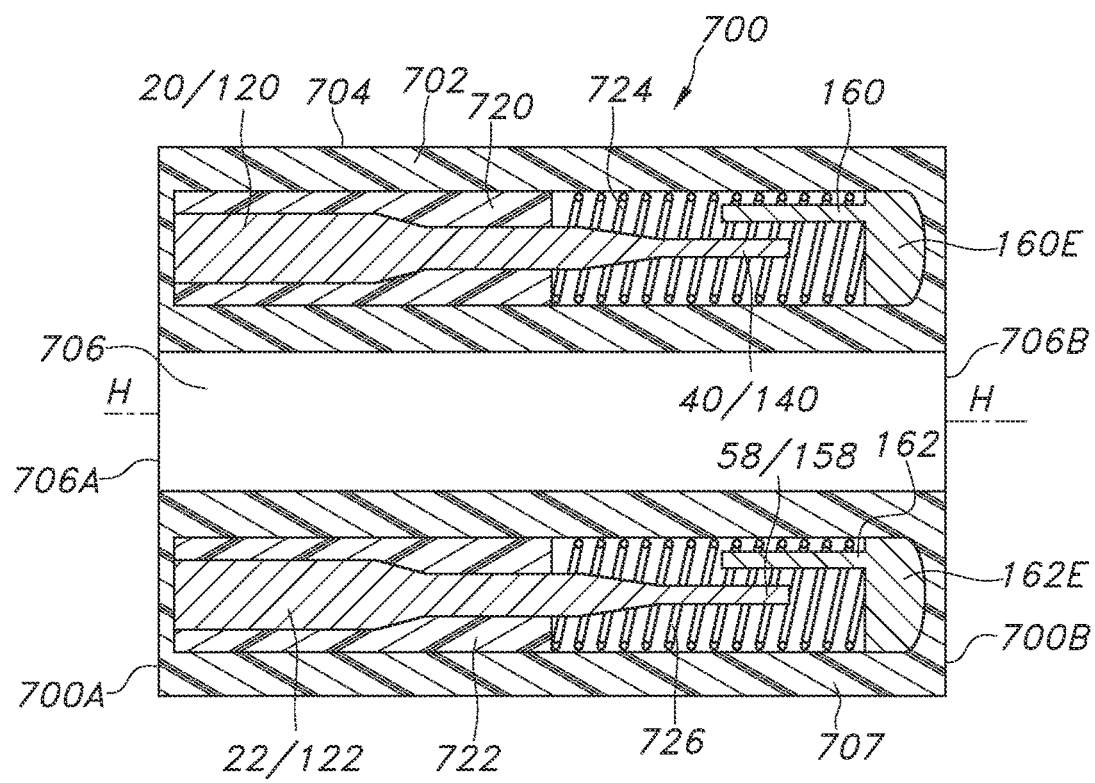
FIG. 19 is a cross-sectional view of another embodiment of a catheter 700 according to the present invention that is similar to the catheter 600 shown in FIG. 18 except that the shaping ribbons 160 and 162 are provided with respective atraumatic tips 160E and 162E.

FIG. 19 is a cross-section of another embodiment of a catheter 700 according to the present invention. Catheter 700 comprises a cylindrically-shaped catheter body 702 having an outer wall 704 extending along a longitudinal axis H-H from a catheter proximal end 700A to a catheter distal end 700B. The catheter 700 has a primary lumen 706 that is in open communication with a proximal opening 706A at the catheter proximal end 700A and a distal opening 706B at the catheter distal end 700B. The catheter body 702 is formed of a biocompatible and biostable polymeric material 707 that extends outwardly from the lumen 706 to the outer wall 704. Suitable biocompatible and biostable primary polymeric materials are similar to those described above for polymeric material 17 shown in FIGS. 1, 1A, 2 and 3. Preferably the catheter lumen 706 has a cylindrical shape throughout its length extending to the proximal and distal openings, but, as described above with respect to the catheter 10 shown in FIGS. 1 and 2, that is not required.

The catheter 700 is similar to the catheter 600 shown in FIG. 18 with the exception that the shaping ribbons 160 and 162 are provided with respective atraumatic tips 160E and 162E. The atraumatic tips 160E and 162E end proximal the distal end 702B of the catheter 700.

Figure 20:
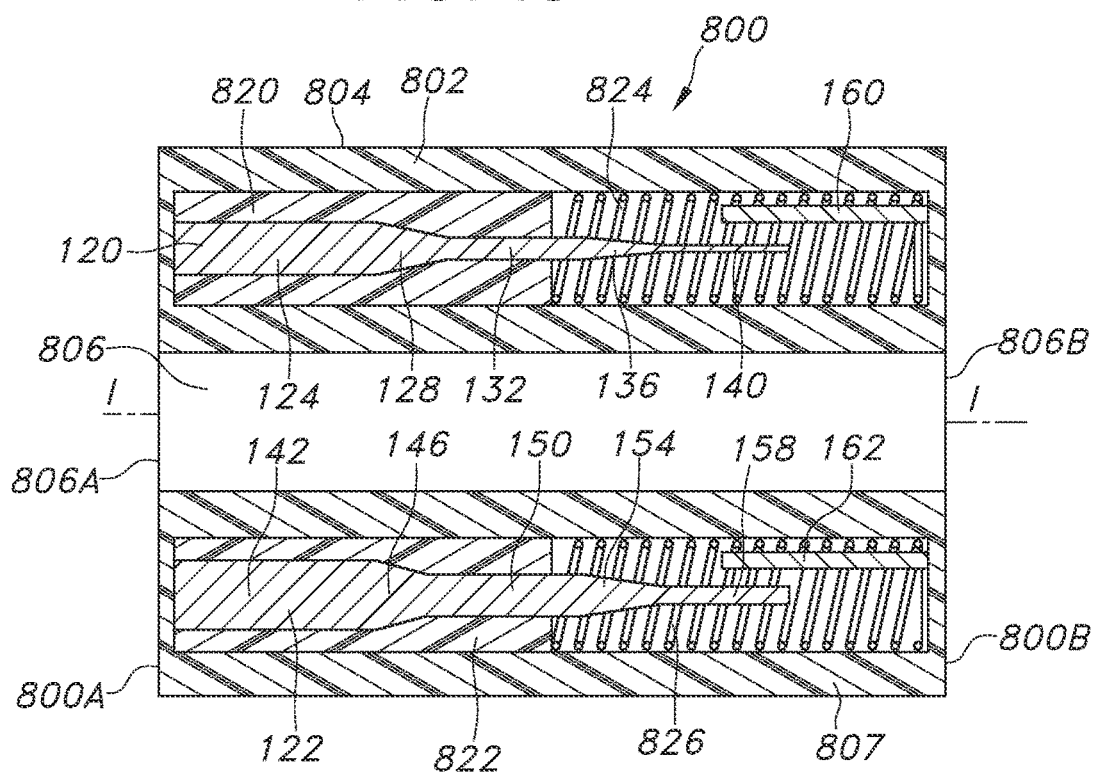
FIG. 20 is a cross-sectional view of a catheter 800 that is similar to the catheter 600 shown in FIG. 18 except that core wire 120 is of a lesser cross-sectional diameter than core wore 122.

FIG. 20 is a cross-section of another embodiment of a catheter 800 that is similar to the catheter 600 shown in FIG. 18. Catheter 800 comprises a cylindrically-shaped catheter body 802 having an outer wall 804 extending along a longitudinal axis I-I from a catheter proximal end 800A to a catheter distal end 800B. The catheter 800 has a primary lumen 806 that is in open communication with a proximal opening 806A at the catheter proximal end 800A and a distal opening 806B at the catheter distal end 800B. The catheter body 802 is formed of a biocompatible and biostable polymeric material 807 that extends outwardly from the lumen 806 to the outer wall 804. Suitable biocompatible and biostable primary polymeric materials are similar to those described above for polymeric material 17 shown in FIGS. 1, 1A, 2 and 3. Preferably the catheter lumen 806 has a cylindrical shape throughout its length extending to the proximal and distal openings, but, as described above with respect to the catheter 10 shown in FIGS. 1 and 2, that is not required.

In this embodiment the diameters of the proximal cylindrical portion 124, the first tapered portion 128, the intermediate cylindrical portion 132, the second tapered portion 136 and the distal ribbon-shaped portion 140 of the third core wire 120 are less than the corresponding diameters of the proximal cylindrical portion 142, the first tapered portion 146, the intermediate cylindrical portion 150, the second tapered portion 154 and the distal ribbon-shaped portion 158 of the fourth core wire 122. The third core wire 120 is provided with a secondary polymeric coating 820 of PTFE or polyimide that ends somewhere along the length of the intermediate cylindrical portion 132. A helically-wound stainless steel or nitinol coil spring 824 serving as a sleeve houses the remainder of the third core wire 120 beginning at the distal end of the polymeric coating 820 and extends to the distal end of the shaping ribbon 160. The fourth core wire 122 is similarly coated with a secondary polymeric material 822 of PTFE or polyimide that ends somewhere along the length of the intermediate cylindrical portion 150. A helically-wound stainless steel or nitinol coil spring 826 houses the remainder of the fourth core wire 122 beginning at the distal end of the secondary polymeric coating 822 and extends to the distal end of the shaping ribbon 162.

Figure 21:
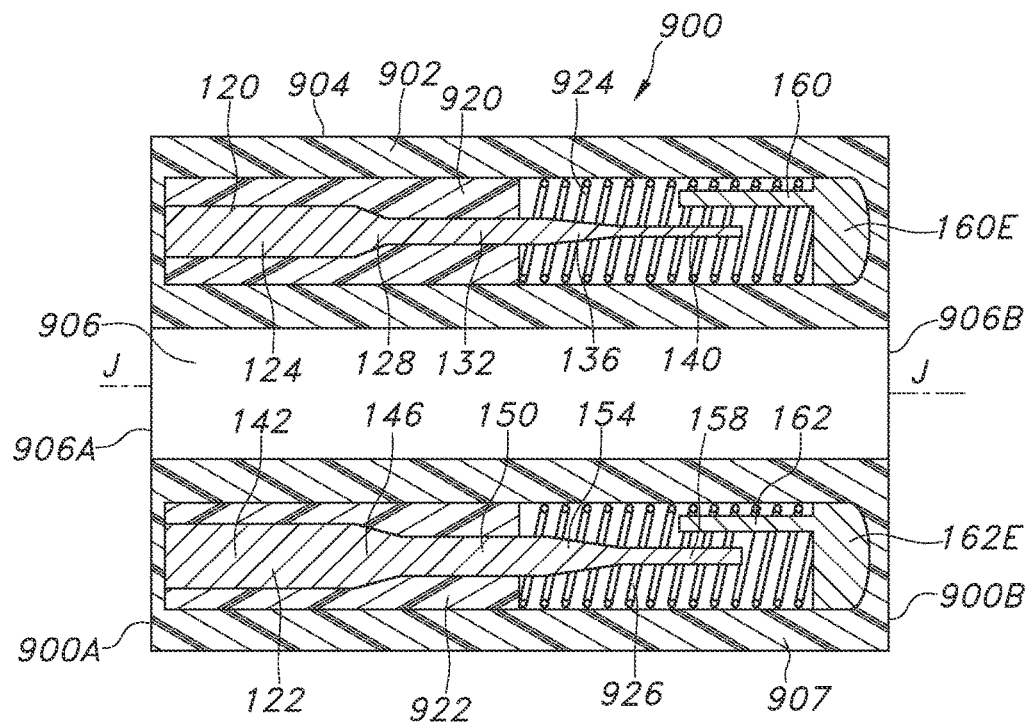
FIG. 21 is a cross-sectional view of a catheter 900 that is similar to the catheter 800 shown in FIG. 20 but with the shaping ribbons 160 and 162 provided with respective atraumatic tips 160E and 162E.

FIG. 21 is a cross-section of another embodiment of a catheter 900 that is similar to the catheter 800 shown in FIG. 20. Catheter 900 comprises a cylindrically-shaped catheter body 902 having an outer wall 904 extending along a longitudinal axis J-J from a catheter proximal end 900A to a catheter distal end 900B. The catheter 900 has a primary lumen 906 that is in open communication with a proximal opening 906A at the catheter proximal end 900A and a distal opening 906B at the catheter distal end 900B. The catheter body 902 is formed of a biocompatible and biostable polymeric material 907 that extends outwardly from the lumen 906 to the outer wall 904. Suitable biocompatible and biostable primary polymeric materials are similar to those described above for polymeric material 17 shown in FIGS. 1, 1A, 2 and 3. Preferably the catheter lumen 906 has a cylindrical shape throughout its length extending to the proximal and distal openings, but, as described above with respect to the catheter 10 shown in FIGS. 1 and 2, that is not required.

In this embodiment the diameters of the proximal cylindrical portion 124, the first tapered portion 128, the intermediate cylindrical portion 132, the second tapered portion 136 and the distal ribbon-shaped portion 140 of the third core wire 120 are less than the corresponding diameters of the proximal cylindrical portion 142, the first tapered portion 146, the intermediate cylindrical portion 150, the second tapered portion 154 and the distal ribbon-shaped portion 158 of the fourth core wire 122. The third core wire 120 is provided with a secondary polymeric coating 920 of PTFE or polyimide that ends somewhere along the length of the intermediate cylindrical portion 132. A helically-wound stainless steel or nitinol coil spring 924 serving as a sleeve houses the remainder of the third core wire 120 beginning at the distal end of the polymeric coating 920 and extends to the distal end of the shaping ribbon 160.

The fourth core wire 122 is similarly coated with a secondary polymeric material 922 of PTFE or polyimide that ends somewhere along the length of the intermediate cylindrical portion 150. A helically wound stainless steel or nitinol coil spring 926 serving as a sleeve houses the remainder of the fourth core wire 122 beginning at the distal end of the secondary polymeric coating 922 and extends to the distal end of the shaping ribbon 162.

In that respect, catheter 900 is similar to the catheter 700 shown in FIG. 19 with the exception that the shaping ribbons 160 and 162 are provided with respective atraumatic tips 160E and 162E. The atraumatic tips 160E and 162E end proximal the distal end 702B of the catheter 700.

Figure 22:
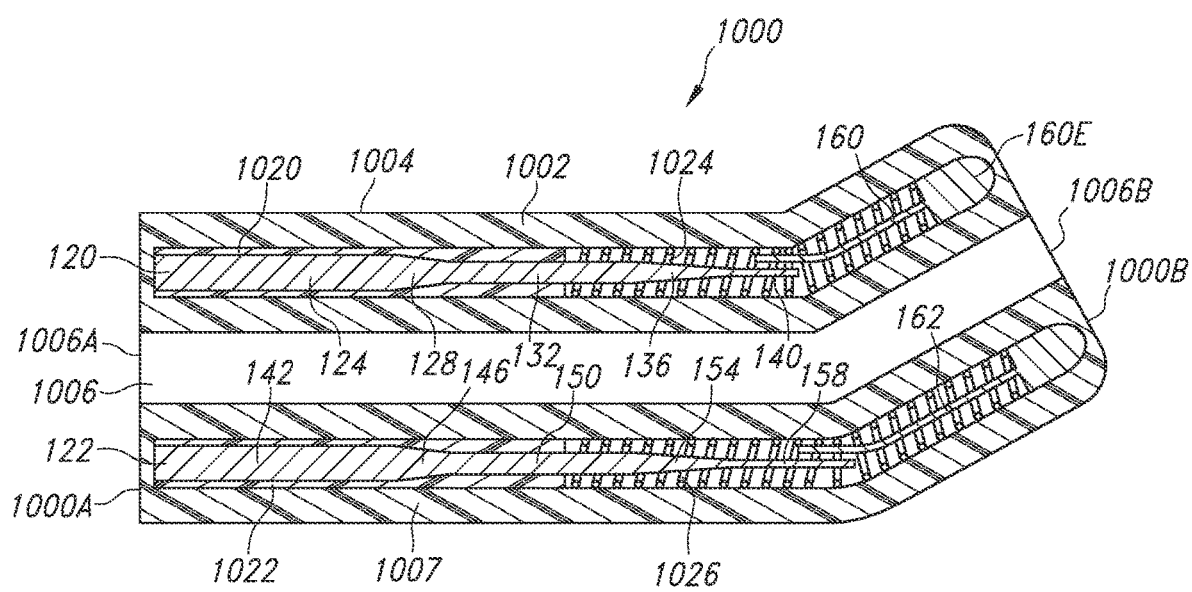
FIG. 22 is a cross-sectional view of a catheter 1000 that is similar to the catheter 900 shown in FIG. 21 except that core wire 122 is longer than core wire 120.

FIG. 22 is a cross-sectional view of a catheter 1000 that is similar to the catheter 900 shown in FIG. 21 except that core wire 122 is longer than core wire 120. In that respect, catheter 1000 comprises a cylindrically-shaped catheter body 1002 having an outer wall 1004 extending from a catheter proximal end 1000A to a catheter distal end 1000B. The catheter 1000 has a primary lumen 1006 that is in open communication with a proximal opening 1006A at the catheter proximal end 1000A and a distal opening 1006B at the catheter distal end 1000B. The catheter body 1002, which is formed of a biocompatible and biostable polymeric material 1007 similar to those described above for polymeric material 17 shown in FIGS. 1, 1A, 2 and 3, extends outwardly from the lumen 1006 to the outer wall 1004. Preferably the catheter lumen 1006 has a cylindrical shape throughout its length extending to the proximal and distal openings, but, as described above with respect to the catheter 10 shown in FIGS. 1 and 2, that is not required.

FIG. 22 further shows that the first and second core wires 120 and 122 are coated with respective secondary polymeric materials 1020 and 1022 of PTFE or polyimide for a portion of their lengths in a similar manner as shown with the catheter 400 of FIGS. 13 to 16. The secondary polymeric coatings 1020 and 1022 extend from the proximal ends of the respective seventh and tenth cylindrical portions 124 and 142 to a location somewhere along the length of the respective eighth and eleventh cylindrical portions 132 and 150. Respective helically-wound stainless steel or nitinol coil springs 1024 and 1026 then extend from the distal ends of the polymeric coatings 1020 and 1022 to the distal ends of the respective shaping ribbons 160 and 162. The stainless steel or nitinol shaping ribbons 160 and 162 are provided with respective atraumatic tips 160E and 162E, which end proximal the distal end 1002B of the catheter 1000.

Further, the ribbon-shaped portion 158 of core wire 122 is axially longer than the corresponding ribbon-shaped portion 140 of core wire 120. Additionally, the shaping ribbon 160 corresponding to the core wire 120 is shorter than the shaping ribbon 162 corresponding to core wire 122. The catheter 1000 is shown in a pre-bent orientation bending towards the ribbon-shaped portion 140 of the lesser length. Providing the ribbon-shaped portion 158 of core wire 122 and its corresponding shaping ribbon 162 with the greater length helps maintain this bend. Since the core wire 122 and its shaping ribbon 162 reside on the outside of the bend, they must have a greater length than the core wire 120 and corresponding shaping ribbon 160 residing on the inside of the bend. That is because core wire 122 and shaping ribbon 162 have a greater radius of curvature than the inner core wire 120 and corresponding shaping ribbon.

Thus, various embodiments of catheters with at least one pair of core wires disposed on opposite sides of a central lumen are described. In the broadest sense, however, a catheter according to the present invention is provided with at least one core wire extending along but spaced from a central catheter lumen. The core wire or wires have reduced diameter distal portions, which can be cylindrical or of a ribbon shape. This provided the distal end of the catheter with a desired degree of flexibility. Further, the embedded core wires greatly improve the torsional rigidity of the catheter so that rotation of the catheter's proximal end translates into a substantially equivalent rotation at the distal end of the catheter. Finally, the present catheter being provided with at least one core wire have the ability to be pushed through the vasculature without the need for the catheter to go over a guidewire already in-situ in the vasculature.

It is appreciated that various modifications to the inventive concepts described herein may be apparent to those skilled in the art without departing from the spirit and scope of the present invention as defined by the hereinafter appended claims.

What is claimed is:
1. A catheter, comprising:
a) a catheter body comprising a thickness extending outwardly from a catheter body inner wall to a catheter body outer wall, wherein the catheter body inner wall defines a catheter lumen extending along a first longitudinal axis from a catheter body proximal end to a catheter body distal end;
b) at least a first core wire embedded in the thickness of the catheter body, wherein the first core wire extends along a second longitudinal axis that is spaced from but parallel to the first longitudinal axis of the catheter lumen, and wherein the first core wire comprises a first core wire proximal portion having a first core wire proximal end that is disposed adjacent to but spaced distally from the catheter body proximal end, and a first core wire distal portion having a first core wire distal end that is disposed adjacent to but spaced proximally from the catheter body distal end; and
c) a first shaping ribbon embedded in the thickness of the catheter body adjacent to the first core wire distal end but spaced proximally from the catheter body distal end,
d) wherein, in a radial direction extending outwardly from the first longitudinal axis of the catheter lumen, the first core wire and the first shaping ribbon are in an overlapping, radially aligned relationship with the first shaping ribbon being spaced radially outwardly from the first longitudinal axis further than the first core wire, and e) wherein the core wire proximal end is spaced distally from the catheter body proximal end by a first proximal distance, and the core wire distal end is spaced proximally from the catheter body distal end by a first distal distance; and f) a shaping ribbon proximal end spaced distally from the catheter body proximal end by a second proximal distance, and a shaping ribbon distal end spaced proximally from the catheter body distal end by a second distal distance, g) wherein the second proximal distance is greater than the first proximal distance, and wherein the first distal distance is greater than the second distal distance.

2. The catheter of claim 1, wherein the first core wire proximal portion is a first core wire proximal cylindrical portion, and the first core wire distal portion is a first core wire distal cylindrical portion, and wherein the first core wire has at least one first core wire tapered portion intermediate the first core wire proximal cylindrical portion and the first core wire distal cylindrical portion.

3. The catheter of claim 1, wherein the first shaping ribbon has an atraumatic tip.

4. The catheter of claim 1, wherein the first core wire distal portion is a first core wire distal ribbon-shaped portion.

5. The catheter of claim 4, wherein the first core wire comprises a first core wire first tapered portion residing intermediate the first core wire proximal cylindrical portion and a first core wire intermediate cylindrical portion, and a first core wire second tapered portion residing intermediate the first core wire intermediate cylindrical portion and the first core wire distal ribbon-shaped portion.

6. The catheter of claim 5, wherein a helically-wound spring embedded in the thickness of the catheter body surrounds at least a portion of the first core wire and extends from the first core wire intermediate cylindrical portion to a helically-wound spring distal end spaced distally from the first core wire distal end, but proximally from the catheter body distal end.

7. The catheter of claim 1, further comprising a second core wire embedded in the thickness of the catheter body, wherein the second core wire extends along a third longitudinal axis that is spaced from but parallel to the first longitudinal axis of the catheter lumen, and wherein the second core wire comprises a second core wire proximal portion having a second core wire proximal end disposed adjacent to but spaced distally from the catheter body proximal end, and a second core wire distal portion having a second core wire distal end disposed adjacent to but spaced proximally from the catheter body distal end.

8. The catheter of claim 7, wherein the second core wire proximal portion is a second core wire proximal cylindrical portion extending to the second core wire proximal end, and the second core wire distal portion is a second core wire distal ribbon-shaped portion extending to the second core wire distal end, and wherein the second core wire comprises at least one second core wire tapered portion intermediate the second core wire proximal cylindrical portion and the second core wire distal ribbon-shaped portion, and wherein a second shaping ribbon is embedded in the thickness of the catheter body adjacent to the second core wire distal ribbon-shaped portion, the second shaping ribbon being disposed adjacent to but proximal the catheter body distal end.

9. The catheter of claim 8, wherein the first core wire distal ribbon-shaped portion has a greater length than the second core wire distal ribbon-shaped portion.

10. The catheter of claim 8, wherein the first shaping ribbon has a greater axial length than the second shaping ribbon.

11. The catheter of claim 8, wherein the first and second distal ribbon-shaped portions of the first and second core wires and their corresponding first and second shaping ribbons are aligned parallel to each other.

12. The catheter of claim 8, wherein the first core wire distal ribbon-shaped portion and its corresponding first shaping ribbon are aligned perpendicular to the second core wire distal ribbon-shaped portion and its corresponding second shaping ribbon.

13. The catheter of claim 7, wherein the first core wire proximal portion is a first core wire proximal cylindrical portion and the first core wire distal portion is a first core wire distal ribbon-shaped portion, and wherein the first core wire comprises at least a first core wire tapered portion intermediate the first core wire proximal cylindrical portion and the first core wire distal ribbon-shaped portion, and wherein the second core wire comprises at least a second core wire tapered portion intermediate the second core wire proximal cylindrical portion and the second core wire distal ribbon-shaped portion, and wherein the first core wire proximal cylindrical portion has a greater cross-sectional diameter than the second core wire proximal cylindrical portion, and the first core wire distal ribbon-shaped portion has a greater cross-sectional diameter than the second core wire distal ribbon-shaped portion.

14. The catheter of claim 7, wherein the catheter lumen is intermediate the first and second core wires.

15. The catheter of claim 7, wherein the first and second core wires are diametrically opposed to each other.

16. The catheter of claim 1, wherein the first core wire and its corresponding first shaping ribbon are provided with a polymeric coating so that the first core wire and the first shaping ribbon have a uniform coated diameter extending from a proximal end of the first core wire at least part-way toward a distal end of the first shaping ribbon.

17. The catheter of claim 16, wherein the polymeric coating extends from the first core wire proximal end part-way along a length of the first core wire, and wherein a first helically-wound coil spring extends from a distal end of the polymeric coating to a distal end of the first shaping ribbon.

18. The catheter of claim 16, wherein the polymeric coating is selected from PTFE and polyimide.

19. The catheter of claim 1, wherein a second catheter lumen extends through the catheter body to the catheter body proximal and distal ends.

20. The catheter of claim 1, wherein the catheter body is of a primary polymeric material selected from the group of Nylon, a block copolymer obtained by polycondensation of a carboxylic acid polyamide with an alcohol termination polyether, PET, silicone, polytetrafluoroethylene (PTFE), polyimide and liquid crystal polymers.

21. The catheter of claim 1, wherein the first shaping ribbon has an atraumatic tip facing the catheter body distal end.

22. The catheter of claim 1, wherein:

a) the first core wire comprises a first core wire first tapered portion residing intermediate the first core wire proximal portion and a first core wire intermediate cylindrical portion, and a first core wire second tapered portion residing intermediate the first core wire intermediate cylindrical portion and the first core wire distal portion; and b) the shaping ribbon proximal end is spaced distally from the first core wire second tapered portion.

23. A catheter, comprising:
a) a catheter body comprising a thickness extending outwardly from a catheter body inner wall to a catheter body outer wall, wherein the catheter body inner wall defines a catheter lumen extending longitudinally from a catheter body proximal end to a catheter body distal end;
b) a first pair of core wires comprising a first core wire and a second core wire embedded in the thickness of the catheter body on opposite sides of the catheter lumen,
   i) wherein the first core wire comprises at least a first core wire tapered portion intermediate a first core wire proximal cylindrical portion and a first core wire distal ribbon-shaped portion, and wherein a first shaping ribbon resides in the catheter body adjacent to the first core wire distal ribbon-shaped portion but spaced proximally from the catheter body distal end, and
   ii) wherein the second core wire comprises at least a second core wire tapered portion intermediate a second core wire proximal cylindrical portion and a second core wire distal ribbon-shaped portion, and wherein a second shaping ribbon resides in the catheter body adjacent to the second core wire distal ribbon-shaped portion but spaced proximally from the catheter body distal end.

24. The catheter of claim 23, further comprising:
c) a second pair of core wires comprising a third core wire and a fourth core wire embedded in the thickness of the catheter body on opposite sides of the catheter lumen,
   iii) wherein the third core wire comprises at least a third core wire tapered portion intermediate a third core wire proximal cylindrical portion and a third core wire distal ribbon-shaped portion, and wherein a third shaping ribbon resides in the catheter body adjacent to the third core wire distal ribbon-shaped portion but spaced proximally from the catheter body distal end, and
   iv) wherein the fourth core wire comprises at least a fourth core wire tapered portion intermediate a fourth core wire proximal cylindrical portion and a fourth core wire distal ribbon-shaped portion, and wherein a fourth shaping ribbon resides in the catheter body adjacent to the fourth core wire distal ribbon-shaped portion but spaced proximally from the catheter body distal end.

25. The catheter of claim 24, wherein the first, second, third and fourth distal ribbon-shaped portions of the first, second, third and fourth core wires and their corresponding first, second, third and fourth shaping ribbons are aligned parallel to each other.

26. The catheter of claim 24, wherein the first pair of core wires comprising the first and second distal ribbon-shaped portions of the respective first and second core wires and their corresponding first and second shaping ribbons are aligned parallel to each other, and wherein the second pair of core wires comprising the third and fourth distal ribbon-shaped portions of the respective third and fourth core wires and their corresponding third and fourth shaping ribbons are aligned parallel to each other, and wherein the first pair of core wires is aligned perpendicular to the second pair of core wires.

27. The catheter of claim 24, wherein the first, second, third and fourth core wires are spaced at 90° intervals about a circumference of the catheter lumen.

28. A catheter, comprising:
a) a catheter body comprising a thickness extending outwardly from a catheter body inner wall to a catheter body outer wall, wherein the catheter body inner wall defines a catheter lumen extending longitudinally from a catheter body proximal end to a catheter body distal end; and
b) a core wire comprising a core wire proximal cylindrical portion having a core wire proximal end disposed adjacent to but spaced distally from the catheter body proximal end, and a core wire distal ribbon-shaped portion having a core wire distal end disposed adjacent to but spaced proximally from the catheter body distal end.

29. The catheter of claim 28, further comprising:
a) a helically-wound spring embedded in the thickness of the catheter body, the helically-wound spring extending from a helically-wound spring proximal end spaced distally from the catheter proximal end to a helically-wound spring distal end spaced proximally from the catheter distal end; and
b) a shaping ribbon residing adjacent to the core wire distal ribbon-shaped portion, wherein the shaping ribbon and the core wire distal ribbon-shaped portion are housed inside the helically wound spring, and wherein the shaping ribbon is spaced proximally from the catheter body distal end.

* * * * *